United States Patent
Jolly et al.

(10) Patent No.: US 8,639,399 B2
(45) Date of Patent: *Jan. 28, 2014

(54) DISTRIBUTED ACTIVE VIBRATION CONTROL SYSTEMS AND ROTARY WING AIRCRAFT WITH SUPPRESSED VIBRATIONS

(75) Inventors: Mark R. Jolly, Raleigh, NC (US);
Askari Badre-Alam, Apex, NC (US);
Russell E. Altieri, Cary, NC (US);
Andrew D. Meyers, Apex, NC (US)

(73) Assignee: Lord Corporaiton, Cary, NC (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/333,196

(22) Filed: Dec. 21, 2011

(65) Prior Publication Data
US 2012/0158217 A1    Jun. 21, 2012

Related U.S. Application Data

(63) Continuation of application No. 12/288,867, filed on Oct. 24, 2008, now Pat. No. 8,090,482.

(60) Provisional application No. 60/982,612, filed on Oct. 25, 2007.

(51) Int. Cl.
*G05D 1/00*    (2006.01)

(52) U.S. Cl.
USPC ............................................................. 701/3

(58) Field of Classification Search
USPC ............... 701/3, 29.2, 29.3, 31.4, 31, 5, 32.7; 700/66, 279, 280
See application file for complete search history.

(56) References Cited

U.S. PATENT DOCUMENTS

| | | | |
|---|---|---|---|
| 2,425,650 | A | 8/1947 | Stalker |
| 3,091,712 | A | 5/1963 | Galbraith |
| 3,158,038 | A | 11/1964 | Goodman |
| 3,219,120 | A | 11/1965 | Hopper |
| 3,412,961 | A | 11/1968 | Howard |
| 3,509,971 | A | 5/1970 | Gerstine et al. |
| 3,538,469 | A | 11/1970 | Litte et al. |
| 3,540,809 | A | 11/1970 | Paul et al. |
| 3,617,020 | A | 11/1971 | Gerstine et al. |
| 3,635,427 | A | 1/1972 | Balke |
| 3,649,132 | A | 3/1972 | Arcidiacono |
| 3,761,851 | A | 9/1973 | Nelson |
| 3,770,997 | A | 11/1973 | Presley |

(Continued)

FOREIGN PATENT DOCUMENTS

| | | |
|---|---|---|
| EP | 0337040 A1 | 10/1989 |
| EP | 0409462 A1 | 1/1991 |

(Continued)

OTHER PUBLICATIONS

Hutchinson Worldwide, Advanced Products Overview, 2005, 17 pages, Evry, France.

(Continued)

*Primary Examiner* — Kim T Nguyen
(74) *Attorney, Agent, or Firm* — Richard G. Miller

(57) ABSTRACT

A method and system is disclosed for controlling problematic vibrations in an aircraft having. The method and system have the ability to cancel problematic rotary wing helicopter vibrations using independent active force generator power and with distributed communications therebetween.

20 Claims, 36 Drawing Sheets

(56) References Cited

U.S. PATENT DOCUMENTS

| | | |
|---|---|---|
| 3,783,746 A | 1/1974 | Jacobellis |
| 3,807,678 A | 4/1974 | Karnopp et al. |
| 3,811,313 A | 5/1974 | Schut |
| 3,830,109 A | 8/1974 | Litvinovich et al. |
| 3,839,945 A | 10/1974 | Jacobellis |
| 3,857,535 A | 12/1974 | Osder |
| 3,910,720 A | 10/1975 | Vincent et al. |
| 4,057,363 A | 11/1977 | Kenigsberg et al. |
| 4,083,654 A | 4/1978 | Kenigsberg et al. |
| 4,084,445 A | 4/1978 | Erwin |
| 4,211,121 A | 7/1980 | Brown |
| 4,213,584 A | 7/1980 | Tefft et al. |
| 4,218,187 A | 8/1980 | Madden |
| 4,255,084 A | 3/1981 | Mouille et al. |
| 4,326,158 A | 4/1982 | Helgesen |
| 4,426,911 A | 1/1984 | Robinson et al. |
| 4,479,098 A | 10/1984 | Watson et al. |
| 4,483,425 A | 11/1984 | Newman |
| 4,561,319 A | 12/1985 | Lilja |
| 4,596,513 A | 6/1986 | Carlson et al. |
| 4,699,348 A | 10/1987 | Freudenberg |
| 4,808,955 A | 2/1989 | Godkin et al. |
| 4,892,328 A | 1/1990 | Kurtzman et al. |
| 4,901,573 A | 2/1990 | Srinivasan et al. |
| 4,922,159 A | 5/1990 | Phillips et al. |
| 4,928,028 A | 5/1990 | Leibovich |
| 4,953,098 A | 8/1990 | Fischer, Jr. et al. |
| 4,963,804 A | 10/1990 | Geiger |
| 5,005,439 A | 4/1991 | Jensen et al. |
| 5,086,564 A | 2/1992 | Schalz |
| 5,092,195 A | 3/1992 | Parsons |
| 5,102,289 A | 4/1992 | Yokoshima et al. |
| 5,170,103 A | 12/1992 | Rouch et al. |
| 5,170,104 A | 12/1992 | Laughlin |
| 5,202,824 A | 4/1993 | Chen |
| 5,213,184 A | 5/1993 | Legouis et al. |
| 5,219,143 A | 6/1993 | Staple et al. |
| 5,231,336 A | 7/1993 | Van Namen |
| 5,251,863 A | 10/1993 | Gossman et al. |
| 5,253,542 A | 10/1993 | Houze |
| 5,278,913 A | 1/1994 | Delfosse et al. |
| 5,310,137 A | 5/1994 | Yoerkie, Jr. et al. |
| 5,345,206 A | 9/1994 | Morcos |
| 5,347,884 A | 9/1994 | Garnjost et al. |
| 5,369,348 A | 11/1994 | Gennesseaux |
| 5,375,794 A | 12/1994 | Bleeg |
| 5,410,879 A | 5/1995 | Houze |
| 5,452,865 A | 9/1995 | Tran et al. |
| 5,497,861 A | 3/1996 | Brotz |
| 5,526,292 A | 6/1996 | Hodgson et al. |
| 5,549,260 A | 8/1996 | Reed, III |
| 5,553,514 A | 9/1996 | Walkowc |
| 5,604,413 A | 2/1997 | Khorrami et al. |
| 5,620,068 A | 4/1997 | Garnjost et al. |
| 5,639,214 A | 6/1997 | Guimbal |
| 5,647,726 A | 7/1997 | Sehgal et al. |
| 5,667,166 A | 9/1997 | Tran et al. |
| 5,682,069 A | 10/1997 | Phillips et al. |
| 5,691,582 A | 11/1997 | Lucas et al. |
| 5,710,822 A | 1/1998 | Steenhagen et al. |
| 5,757,662 A | 5/1998 | Dyer et al. |
| 5,811,821 A | 9/1998 | Alexander et al. |
| 5,825,663 A | 10/1998 | Barba et al. |
| 5,860,625 A | 1/1999 | Tran et al. |
| 5,883,478 A | 3/1999 | Thesling |
| 5,896,076 A | 4/1999 | Van Namen |
| 5,903,077 A | 5/1999 | Garnjost et al. |
| 5,920,173 A | 7/1999 | Mercadal et al. |
| 6,006,875 A | 12/1999 | Van Namen |
| 6,009,985 A | 1/2000 | Ivers |
| 6,018,689 A | 1/2000 | Kumura et al. |
| 6,045,090 A | 4/2000 | Krysinsky et al. |
| 6,059,274 A | 5/2000 | Owen et al. |
| 6,062,818 A | 5/2000 | Manfredotti et al. |
| 6,067,853 A | 5/2000 | Thevenot |
| 6,094,601 A | 7/2000 | Popovich |
| 6,105,685 A | 8/2000 | Bald |
| 6,139,271 A | 10/2000 | Chadwick |
| 6,212,445 B1 | 4/2001 | Barba et al. |
| 6,216,047 B1 | 4/2001 | Goto |
| 6,229,898 B1 | 5/2001 | Goodman |
| 6,236,934 B1 | 5/2001 | Dyer et al. |
| 6,279,704 B1 | 8/2001 | Manfredotti |
| 6,289,575 B1 | 9/2001 | Hollingsworth et al. |
| 6,296,093 B1 | 10/2001 | Norris et al. |
| 6,318,527 B1 | 11/2001 | Byrnes et al. |
| 6,354,536 B1 | 3/2002 | Torok et al. |
| 6,355,994 B1 | 3/2002 | Andeen et al. |
| 6,375,127 B1 | 4/2002 | Appa |
| 6,382,049 B1 | 5/2002 | Chiou et al. |
| 6,416,016 B1 | 7/2002 | Welsh |
| 6,418,228 B1 | 7/2002 | Terai et al. |
| 6,443,273 B1 | 9/2002 | Ledbetter et al. |
| 6,467,723 B1 * | 10/2002 | Rossetti et al. ............ 244/17.11 |
| 6,476,534 B1 | 11/2002 | Vanderbeck et al. |
| 6,480,609 B1 | 11/2002 | Strehlow et al. |
| 6,504,278 B1 | 1/2003 | Bald et al. |
| 6,512,435 B2 | 1/2003 | Van Namen |
| 6,603,224 B1 | 8/2003 | Hollingsworth et al. |
| 6,606,922 B2 | 8/2003 | Case et al. |
| 6,618,646 B1 | 9/2003 | Dyer |
| 6,639,496 B1 | 10/2003 | Van Namen |
| 6,644,590 B2 | 11/2003 | Terpay et al. |
| 6,719,503 B1 | 4/2004 | McCalmont et al. |
| 6,769,872 B2 | 8/2004 | Torok et al. |
| 6,869,375 B2 | 3/2005 | Welsh |
| 6,883,373 B2 | 4/2005 | Dyer |
| 7,003,380 B2 | 2/2006 | MacMartin et al. |
| 7,017,857 B2 | 3/2006 | Hill et al. |
| 7,025,342 B2 | 4/2006 | Nemoto et al. |
| 7,047,109 B2 | 5/2006 | Ogura et al. |
| 7,093,806 B2 | 8/2006 | Osterberg |
| 7,118,328 B2 | 10/2006 | Welsh et al. |
| 7,132,817 B2 | 11/2006 | Noe |
| 7,155,973 B2 | 1/2007 | Dyer |
| 7,267,029 B2 | 9/2007 | Altieri et al. |
| 7,288,861 B1 | 10/2007 | Willard et al. |
| 7,370,829 B2 | 5/2008 | Badre-Alam et al. |
| 7,448,854 B2 | 11/2008 | Jolly |
| 7,456,538 B2 | 11/2008 | Nai et al. |
| 7,471,057 B2 | 12/2008 | Clary |
| 7,523,889 B2 | 4/2009 | Bourjac et al. |
| 7,554,237 B2 | 6/2009 | Clary |
| 7,582,032 B2 | 9/2009 | Manfredotti et al. |
| 7,722,322 B2 | 5/2010 | Altieri et al. |
| 7,942,633 B2 | 5/2011 | Jolly et al. |
| 7,957,851 B2 * | 6/2011 | Braswell et al. ................ 701/3 |
| 7,958,801 B2 | 6/2011 | Frederickson |
| 8,021,115 B2 | 9/2011 | Welsh |
| 8,090,482 B2 * | 1/2012 | Jolly et al. ...................... 701/3 |
| 8,162,606 B2 | 4/2012 | Jolly et al. |
| 8,267,652 B2 | 9/2012 | Jolly et al. |
| 2001/0035068 A1 | 11/2001 | Case et al. |
| 2002/0123403 A1 | 9/2002 | Welsh |
| 2003/0060903 A1 | 3/2003 | MacMartin et al. |
| 2003/0089193 A1 | 5/2003 | Altieri et al. |
| 2004/0036367 A1 | 2/2004 | Denton et al. |
| 2004/0050999 A1 | 3/2004 | Hill et al. |
| 2004/0098168 A1 | 5/2004 | Dyer |
| 2005/0075210 A1 | 4/2005 | Frederickson |
| 2005/0079056 A1 | 4/2005 | Welsh |
| 2005/0114053 A1 | 5/2005 | Southward et al. |
| 2005/0184193 A1 | 8/2005 | Bourjac |
| 2005/0201863 A1 | 9/2005 | Welsh |
| 2006/0054738 A1 | 3/2006 | Badre-Alam |
| 2006/0083617 A1 | 4/2006 | Jolly et al. |
| 2006/0135302 A1 | 6/2006 | Manfredotti et al. |
| 2007/0156289 A1 | 7/2007 | Altieri et al. |
| 2009/0035137 A1 | 2/2009 | Jolly et al. |
| 2009/0116963 A1 | 5/2009 | Welsh |
| 2009/0236468 A1 | 9/2009 | Welsh |
| 2009/0254230 A1 | 10/2009 | Jolly et al. |
| 2010/0012768 A1 | 1/2010 | Jolly |
| 2010/0034655 A1 | 2/2010 | Jolly et al. |

(56) References Cited

U.S. PATENT DOCUMENTS

| | | |
|---|---|---|
| 2010/0209242 A1 | 8/2010 | Popelka et al. |
| 2010/0221096 A1 | 9/2010 | Altieri et al. |
| 2010/0221110 A1 | 9/2010 | Jolly et al. |
| 2011/0027081 A1 | 2/2011 | Jolly et al. |

FOREIGN PATENT DOCUMENTS

| | | |
|---|---|---|
| EP | 0409462 B1 | 1/1991 |
| EP | 0506772 B1 | 10/1992 |
| EP | 0601527 B1 | 4/1997 |
| EP | 0805288 | 5/1997 |
| EP | 0805288 A2 | 5/1997 |
| EP | 0776431 B1 | 6/1997 |
| EP | 0840191 A1 | 5/1998 |
| GB | 1120193 | 7/1968 |
| GB | 1120193 A | 7/1968 |
| JP | 61164109 A | 7/1986 |
| JP | 2001233296 | 8/2001 |
| WO | 0049309 | 8/2000 |
| WO | 03028194 | 4/2003 |
| WO | 03028194 A1 | 4/2003 |
| WO | 03072436 A1 | 9/2003 |
| WO | 2006135405 A2 | 12/2006 |
| WO | 2008033884 A2 | 3/2008 |
| WO | 2008079431 A2 | 7/2008 |
| WO | 2008133614 A1 | 11/2008 |
| WO | 2009055007 A2 | 4/2009 |

OTHER PUBLICATIONS

Renishaw, Magnetic rotary encoders, http://www.renishaw.com/client/product/UKEnglish/PGP-1136.shtml, Jun. 5, 2006, 2 pages.

Austriamicrosystems, AS 5045 12-bit programmable magnetic rotary encoder, http://www.austriamicrosystems.com/03products/products detail/AS5045/description AS5045.htm, Jun. 5, 2006, 1 page.

Austriamicrosystems, AS 5043 10-bit programmable 360 magnetic angle encoder with absolute digital and analog outputs, http://www.austriamicrosystems.com/03products/products detail/AS5043/description AS5043.htm, Jun. 5, 2006, 1 page.

Austriamicrosystems, AS 5040 10-bit programmable magnetic rotary encoder, http://www.austriamicrosystems. com/03products/products detail/AS5040/description AS5040.htm, Jun. 5, 2006, 1 page.

Austriamicrosystems, AS 5035 programmable 64ppr incremental magnetic rotary encoder, http://www.austriamicrosystems.com/03products/products detail/AS5035/description AS5035.htm, Jun. 5, 2006, 1 page.

Renishaw, RM22 non-contact 5V, http://www.renishaw.com/client/product/UKEnglish/PGP-6074.shtml, Jun. 5, 2006, 3 pages.

Moog Aircraft Group, Vibration Suppression Actuation System, http://www.moog.com. 2001, 2 pages, East Aurora, New York, U.S.

Aviation Week, Boeing's CH-47 ULOR-the Wing's the Thing, 2008, The McGraw-Hill Companies, Inc., 2 pages.

National Aeronautics and Space Administration, Dynamic Response of NASA Rotor Test Apparatus and Sikorsky S-76 Hub Mounted in the 80- by 120-Foot Wind Tunnel, NASA Technical Memorandum 108847, Sep. 1994, 28 pages.

Oliviera. Bauchau, Jesus Rodriguez, Shyi-Yaung Chen, Modeling the Bifilar Pendulum Using Nonlinear, Flexible Multibody Dynmaics, Journal of the American Helicopter Society, 47, No. 1, pp. 53-62, 2003, 36 pages.

Eliot Quon, Mechanical and Aerospace Engineering, Sikorsky Aircraft, Summer 2007.

Heverly D E et al, An Optimal Actuator Placement Methodology for Active Control of Helicopter Airframe Vibrations, Journal of the American Helicopter Society, American Helicopter Society, Alexandria, VA, US, vol. 46, No. 4, Oct. 1, 2011, pp. 251-261.

Kollmorgen, BM(s) Series Motors, Radford, VA, pp. 1-17.

Moog Inc., General Characteristics—High Frequency Rotor/Stator Units, East Aurora, NY, pp. 1-6.

Advances Motion Controls, B30A40 Series Brushless Servo Amplifiers, Camarillo, CA, pp. C-59-C-66.

BEI Technologies, Inc., VCA 100 Standalone Voice Coil Servo Controller/Amplifier, Sep. 19, 2003, pp. 1-2.

KCF Technologies, Inc., Electro-Magnetic Shaker (20 N), Part No. KCF-5500, pp. 1-5.

Padfield, R. Randall, Bell 427 Much More than a 407 with a Second Engine, www.ainonline.com, Mar. 15, 2005, pp. 1-12.

Oswald Regelbare Elektromotoren, Linear Direct Drives, Three-Phase Synchronous Linear Motors, Series LIN-S...L with external cooling, Series LIN-S...F with liquid cooling, Miltenberg, pp. 1-6.

California Linear Devices, Inc., High Performance Linear Servo Motors, www.calinear.com, Apr. 12, 2005, pp. 1-2.

California Linear Devices, Inc., CLD Linear Motors, www.calinear.com, Apr. 12, 2005, pp. 1-2.

Van Namen, F.T., Electromagnetic Linear Actuators for Active Vibration Control, Motran Industries, Inc., Valencia, CA, Apr. 7, 2005, pp. 1-2.

Procter, George, Linear Motor Advantages in Machine Vision Systems, Copley Controls Corp., Canton, MA, pp. 1-5.

Motran Industries, Inc., Valencia, CA, AFX 470-100, www.motran.com, Apr. 11, 2005, pp. 1-2.

Motran Industries, Inc., Valencia, CA, Inertial Force Actuators, www.motran.com, Apr. 11, 2005, pp. 1-2.

Motran Industries, Inc., Electromagnetic Linear Actuators for Active Vibration Control, Jul. 28, 2003, pp. 1-2.

Ryota Okawa, et al., Modal Analysis of HDDs Actuators, Fujikura Technical review, 2002, pp. 7-12.

Adaptronics, Inc., Glossary of Common Terms, Sep. 24, 2003, pp. 1-3.

Adaptronics, Inc., Piezoelectric Actuators, Sep. 24, 2003, pp. 1-2.

Motran Industries, Inc., Inertial Actuator, Jul. 28, 2003, pp. 1-2.

C.Y. Chen, et al., Passive Voice Coil Feedback Control of Closed-Box Subwoofer System, Proc. Instn Mech Engrs, vol. 214, part C, 2000, pp. 995-1005.

Motran Industries, Inc., The Intertial Force Tranducer, Jul. 28, 2003, pp. 1-4.

Motran Industries, Inc., The Axial Force Transducer, Jul. 28, 2003, pp. 1-5.

Motran Industries, Inc., Inertial Force Actuators, Jun. 16, 2000, pp. 1-2.

Vibration & Waves, Damped Harmonic Motion, General Solutions, Feb. 17, 2004, pp. 1-2.

Vibration & Waves, Damped Harmonic Motion, Heavy Damping, Feb. 17, 2004, pp. 1-2.

Motion Control Solutions, Voice Coil Actuators, 1998, p. 1.

Anthony C. Morcos, Voice Coil Actuators for Use in Motion Control Systems, Motion Magazine, Fall 1998, pp. 1-5.

BEI Technologies, Inc., Compact Bi-Directional Linear Actuator Offers Solutions for Hysteresis-Free Operating Requirements, Sep. 19, 2003, pp. 1-2.

BEI Technologies, Inc., Worlds Largest and Most Powerful Voice Coil Actuator, Jan. 2003, p. 1.

BEI Technologies, Inc., Abbreviated Specifications for VCA 100 Stand-Alone Voice Coil Servo., 1998, p. 1.

Vibration & Waves, Damped Harmonic Motion, Light Damping, Feb. 17, 2004, pp. 1-8.

Adaptronic Congress, Paulstra—Vibrachoc—Stopchoc, Gottingen, Germany, May 31, 2005, pp. 1-17.

Koch, Kathleen, NTSB Scrutinizing Airbus Mechanical Problem, CNN.com, Feb. 6, 2002, pp. 1-4.

Cordle, Ina Paiva, Grounding of Airbus Fleet Urges, Airdisaster.com forums, Mar. 15, 2005, pp. 1-8.

Hai Day Four: BLR's New 'Fast Fin' Stops Huey Tail Wag, Saves Fuel. . . , shephard.co.uk/rotorhub, Feb. 8, 2005, pp. 1-3.

Milliman, John C., COTS Fix Reduces Stress in Hueys and Their Pilots, Navair, Press Release No. E200303111, Mar. 11, 2003, pp. 1-4.

Simulation of Comanche Tail-Buffet, rotorcraft.arc.nasa.gov, Mar. 17, 2005, pp. 1-8.

(56) References Cited

OTHER PUBLICATIONS

Meakin, Robert L., and Wissink, Andrew M., Unsteady Aerodynamic Simulation of Static and Moving Bodies Using Scalable Computers, American Institute of Aeronautics and Astronautics, AIAA-99/3302, pp. 1-15.

Hauch, R.M., et al., Reduction of Vertical Tail Buffet Response Using Active Control, Journal of Aircraft, Vol. 33(3), May-Jun. 1996, pp. 617-622.

Schwach, Howard, Pilot's Demand: Ground Airbus 'Aircraft Tail problems Were Common Knowledge', www.rockawave.com, Feb. 2, 2002, pp. 1-3.

Padfield, R. Randall, Bell 427 Much More than a 407 with a Second Engine, ainonline.com, Mar. 15, 2005, pp. 1-12.

Georgia Institute of Technology, Tail Buffet Alleviation of High Performance Twin Tail Aircraft using Offset Piezoceramic Stack Actuators and Acceleration Feedback Control, ae.gatech.edu, Mar. 17, 2005, pp. 1-3.

Hanagud, S. et al., Tail Buffet Alleviation of High Performance Twin Tail Aircraft Using Piezo-Stack Actuators, American Institute of Aeronautics and Astronautics, AIAA-99/1320, pp. 1-11.

Oswald Regelbare Elektromotoren, Linear Direct Drives, Three-Phase Synchronous Linear Motors, Series LIN-S . . .L with external cooling, Series LIN-S . . .F with liquid cooling, Miltenberg, pp. 1-6.

California Linear Devices, Inc., High Performance Linear Servo Motors, calinear.com, Apr. 12, 2005, pp. 1-2.

California Linear Devices, Inc., CLD Linear Motors, calinear.com, Apr. 12, 2005, pp. 1-2.

Van Namen, F.T., Electromagnetic Linear Actuators for Active Vibration Control, Motran Industries Inc., Valencia, CA, Apr. 7, 2005, pp. 1-2.

Motran Industries, Inc., Valencia, CA, AFX 470-100, motran.com, Apr. 11, 2005, pp. 1-2.

Motran Industries, Inc., Valencia, CA, Inertial Force Actuators, motran.com, Apr. 11, 2005, pp. 1-2.

Advanced Motion Controls, B30A40 Series Brushless Servo Amplifiers, Camarillo, CA, pp. C-59-C-66.

Motran Industries Inc., Electromagnetic Linear Actuators for Active Vibration Control. Jul. 28, 2003, pp. 1-2.

Ryota Okawa et al., Modal Analysis of HDDs Actuators, Fujikura Technical review, 2002, pp. 7-12.

Motran Industries Inc., Inertial Actuator, Jul. 28, 2003, pp. 1-2.

Motran Industries Inc., The Intertial Force Transducer, Jul. 28, 2003, pp. 1-4.

Motran Industries Inc., The Axial Force Transducer, Jul. 28, 2003, pp. 1-5.

Motran Indusctries Inc., Inertial Force Actuators, Jun. 16, 2000, pp. 1-2.

Vibration & Waves, Damped Harmonic Motion, General Solution, Feb. 17, 2004, pp. 1-2.

Vibration & Waves, Damped Harmonic Motion, Critical Damping, Feb. 17, 2004, pp. 1-2.

Motran Industries Inc., Axial Force Transducer, Jul. 28, 2003, pp. 1-2.

BEI Technologies, Inc., Abbreviated Specifications for VCA100 Stand-Alone Voice Coil Servo., 1998, p. 1.

* cited by examiner

DISTRIBUTED MASTER SYSTEM CONTROL AUTHORITY

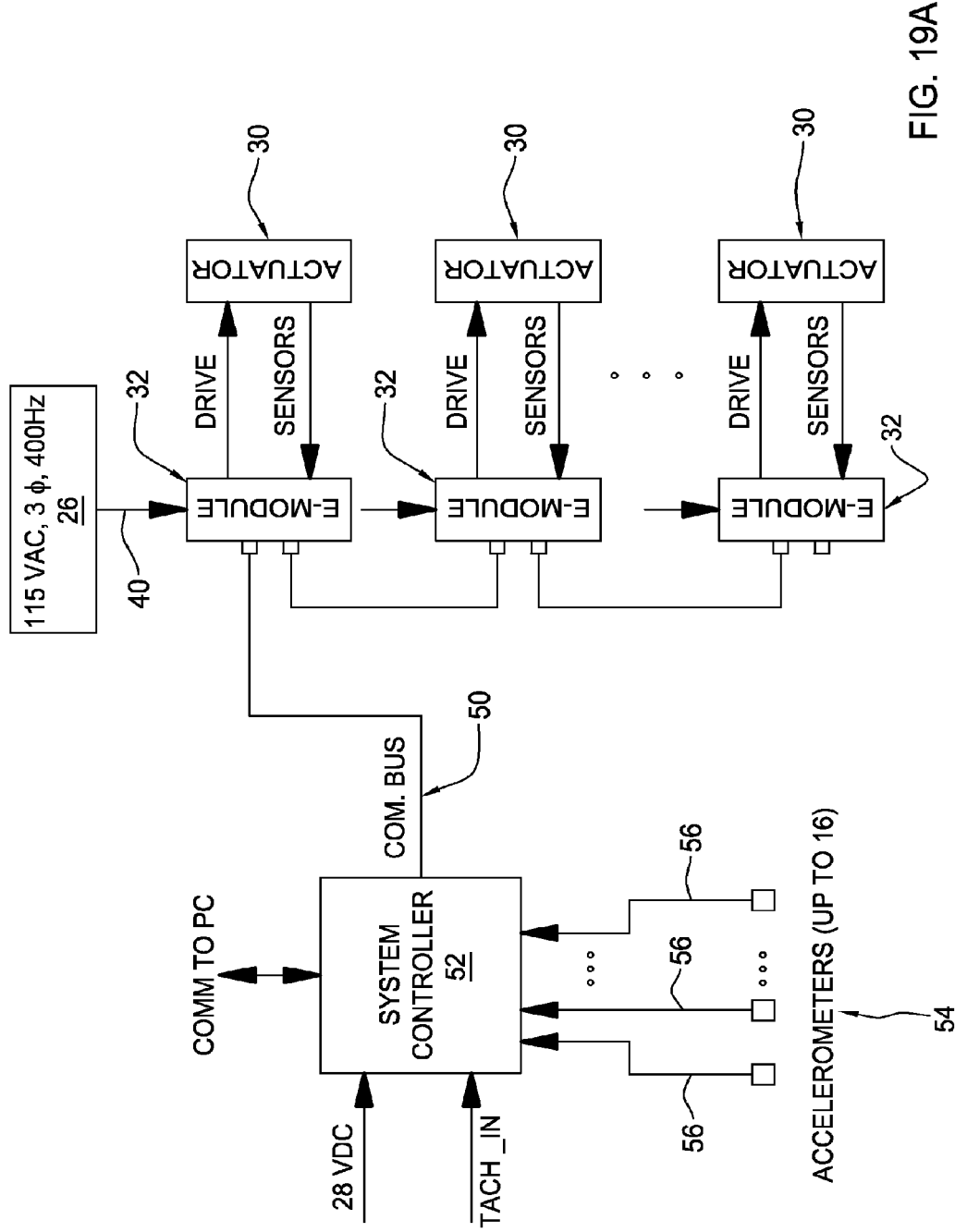

DISTRIBUTED ACTIVE VIBRATION CONTROL SYSTEMS AND ROTARY WING AIRCRAFT WITH SUPPRESSED VIBRATIONS

CROSS REFERENCE

This application is a Continuation Application of, claims the benefit of, and incorporates by reference, U.S. patent application Ser. No. 12/288,867, filed Oct. 24, 2008, now U.S. Pat. No. 8,090,482, which claims the benefit of and incorporates by reference, U.S. Provisional Patent Application No. 60/982,612 filed on Oct. 25, 2007.

FIELD OF INVENTION

The present invention relates to a method/system for controlling problematic vibrations. More particularly the invention relates to a method and system for controlling aircraft vehicle vibrations, particularly a method and system for canceling problematic rotary wing helicopter vibrations.

BACKGROUND OF THE INVENTION

Helicopter vibrations are particularly troublesome in that they can cause fatigue and wear on the equipment and occupants in the aircraft. In vehicles such as helicopters, vibrations are particularly problematic in that they can damage the actual structure and components that make up the vehicle in addition to the contents of the vehicle.

There is a need for a system and method of accurately and economically canceling vehicle vibrations. There is a need for a system and method of accurately and economically controlling vibrations. There is a need for an economically feasible method of controlling vibrations in a helicopter so that the vibrations are efficiently cancelled and minimized. There is a need for a robust system of controlling vibrations in a helicopter so that the vibrations are efficiently cancelled and minimized. There is a need for an economic method/system for controlling problematic helicopter vibrations.

SUMMARY OF THE INVENTION

In an embodiment the invention includes an aircraft with troublesome vibrations. The aircraft includes an aerostructure. The aircraft includes a power source outputting a plurality of electromagnetic force generator power outputs. The aircraft includes at least a first distributed active vibration electromagnetic force generator. The first distributed active vibration electromagnetic force generator includes a first distributed electronic control system. The first distributed active vibration electromagnetic force generator includes a first electromagnetically driven mass. The first distributed active vibration electromagnetic force generator is fixed to the aerostructure at a first distributed active vibration control system site with the first driven mass driven relative to said first fixed aerostructure site. The aircraft includes at least a second distributed active vibration electromagnetic force generator. The second distributed active vibration electromagnetic force generator includes a second distributed electronic control system. The second distributed active vibration electromagnetic force generator includes a second electromagnetically driven mass. The second distributed active vibration electromagnetic force generator is fixed to the aerostructure at a second distributed active vibration control system site with the second driven mass driven relative to said second fixed aerostructure site. The aircraft includes a plurality of electrical power distribution lines, the electrical power distribution lines connecting the electromagnetic force generators with the power source with the electromagnetic force generator power outputs outputted to the electromagnetic force generator. The aircraft includes a distributed force generator data communications network, the distributed force generator data communications system network linking together the at least first and second distributed electronic control systems wherein the distributed electronic control systems communicate force generator vibration control data through the distributed force generator data communications network independently of the electrical power distribution lines to minimize the troublesome vibrations.

In an embodiment the invention includes a method of making an aircraft with suppressed inflight troublesome vibrations. The method includes providing an aircraft comprised of an aerostructure and providing at least a first distributed active vibration electromagnetic force generator, the first distributed active vibration electromagnetic force generator including a first distributed electronic control system and a first electromagnetically driven mass. The method includes fixing the first distributed active vibration electromagnetic force generator to the aerostructure at a first distributed active vibration control system site. The method includes providing at least a second distributed active vibration electromagnetic force generator, the second distributed active vibration electromagnetic force generator including a second distributed electronic control system and a second electromagnetically driven mass. The method includes fixing the second distributed active vibration electromagnetic force generator to the aerostructure at a second distributed active vibration control system site. The method includes connecting the at least first and second electromagnetic force generators with a plurality of electrical power distribution lines to a power source. The method includes providing a distributed force generator data communications network, the distributed force generator data communications network linking together the at least first and second distributed electronic control systems. The method includes communicating force generator vibration control data through the distributed force generator data communications network independently of the electrical power distribution lines to minimize the troublesome vibrations.

In an embodiment the invention includes a method of making a vibration control system for suppressing troublesome vibrations. The method includes providing a structure with at least one rotating machine creating troublesome vibrations. The method includes providing at least a first distributed active vibration electromagnetic force generator, the first distributed active vibration electromagnetic force generator including a first distributed electronic control system and a first electromagnetically driven mass. The method includes fixing the first distributed active vibration electromagnetic force generator to the structure at a first distributed active vibration control system site. The method includes providing at least a second distributed active vibration electromagnetic force generator, the second distributed active vibration electromagnetic force generator including a second distributed electronic control system and a second electromagnetically driven mass. The method includes fixing the second distributed active vibration electromagnetic force generator to the structure at a second distributed active vibration control system site. The method includes connecting the at least first and second electromagnetic force generators with electrical power distribution lines to a power source. The method includes providing a distributed force generator data communications network, the distributed force generator data communications network linking together the at least first and second distributed electronic control systems. The method includes communicating force generator vibration control data through the distributed force generator data communications network to minimize the troublesome vibrations.

In an embodiment the invention includes a vehicle vibration control system for suppressing troublesome vehicle vibrations in a vehicle structure. Preferably the vehicle structure is connected with at least one rotating machine creating troublesome vibrations. The vehicle vibration control system includes at least a first distributed active vibration electromagnetic force generator, the first distributed active vibration electromagnetic force generator including a first distributed electronic control system and a first electromagnetically driven mass, the first distributed active vibration electromagnetic force generator fixed to the vehicle structure at a first distributed active vibration control system site. The vehicle vibration control system includes at least a second distributed active vibration electromagnetic force generator, the second distributed active vibration electromagnetic force generator including a second distributed electronic control system and a second electromagnetically driven mass, the second distributed active vibration electromagnetic force generator fixed to the vehicle structure at a second distributed active vibration control system site. The vehicle vibration control system includes electrical power distribution lines, the electrical power distribution lines connecting the electromagnetic force generators with a power source and providing the electromagnetic force generators with electromagnetic force generator power outputs. The vehicle vibration control system includes a distributed force generator data communications network, the distributed force generator data communications network linking together the at least first and second distributed electronic control systems wherein the distributed electronic control systems communicate force generator vibration control data through the distributed force generator data communications network independently of the electrical power distribution lines to minimize the troublesome vibrations.

In an embodiment the invention includes a method of suppressing troublesome vibrations. The method comprises providing a structure with vibrations. The method comprises providing at least a first distributed active vibration electromagnetic force generator, the first distributed active vibration electromagnetic force generator including a first distributed electronic control system and a first electromagnetically driven mass. The method comprises fixing the first distributed active vibration electromagnetic force generator to the structure. The method comprises providing at least a second distributed active vibration electromagnetic force generator, the second distributed active vibration electromagnetic force generator including a second distributed electronic control system and a second electromagnetically driven mass. The method comprises fixing the second distributed active vibration electromagnetic force generator to the structure. The method comprises connecting the at least first and second electromagnetic force generators with electrical power distribution lines to a power source. The method comprises providing a distributed force generator data communications network, the distributed force generator data communications network linking together the at least first and second distributed electronic control systems and a plurality of distributed networked accelerometers sensing the troublesome vibrations. The method comprises communicating force generator vibration control data through the distributed force generator data communications network to minimize the troublesome vibrations.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 19A-C illustrates distributed active vibration control systems with electromagnetic force generators for suppressing vibrations with a communications bus and electronics modules.

DETAILED DESCRIPTION OF THE PREFERRED EMBODIMENT

Figure 1:
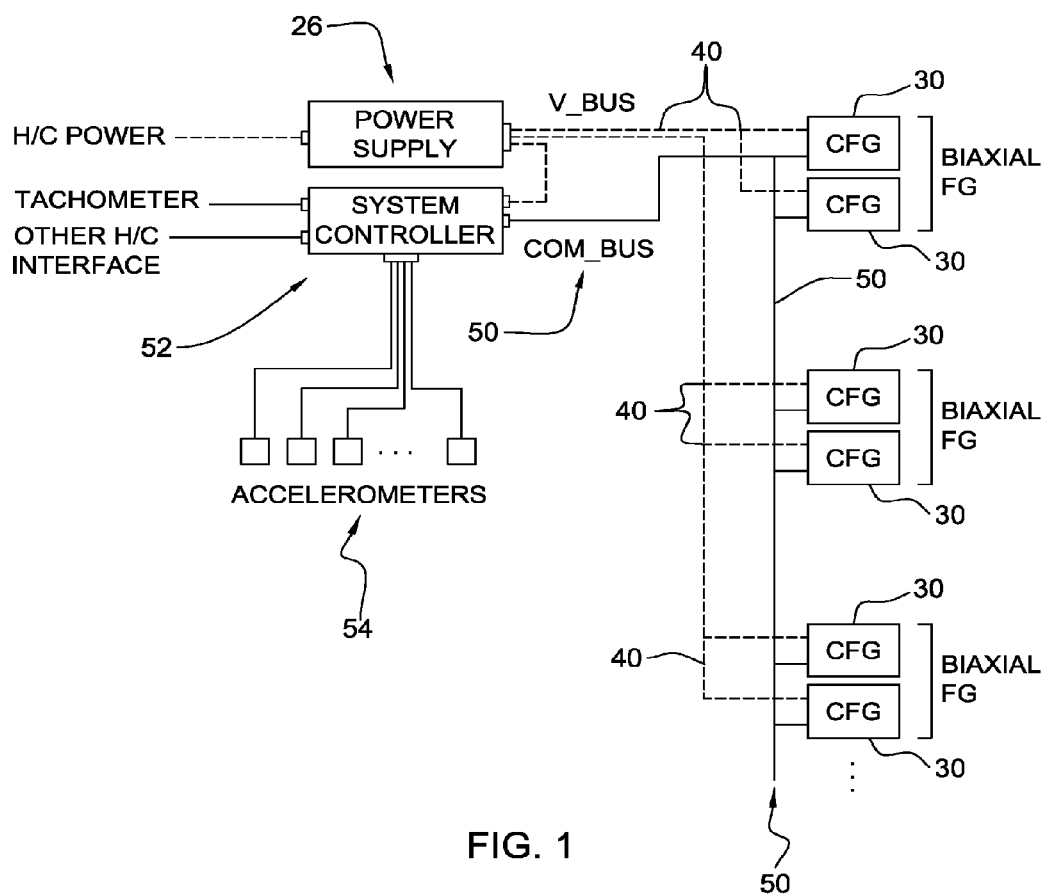
FIG. 1 illustrates a distributed active vibration control system with electromagnetic force generators for suppressing vibrations.
Figure 2:
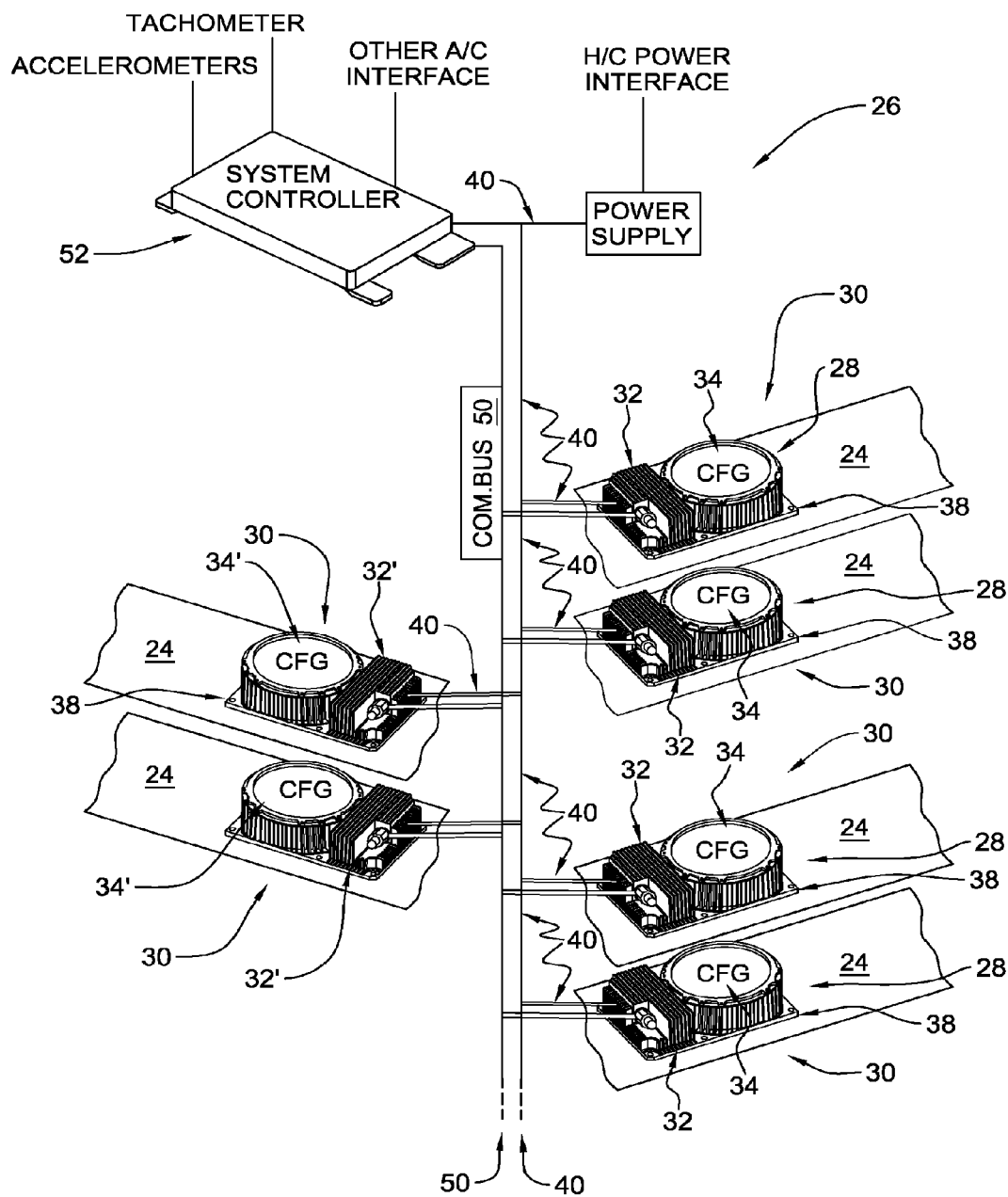
FIG. 2 illustrates a distributed active vibration control system with electromagnetic force generators mounted to an aerostructure vehicle body structure experiencing and transmitting troublesome vibrations.
Figure 3:
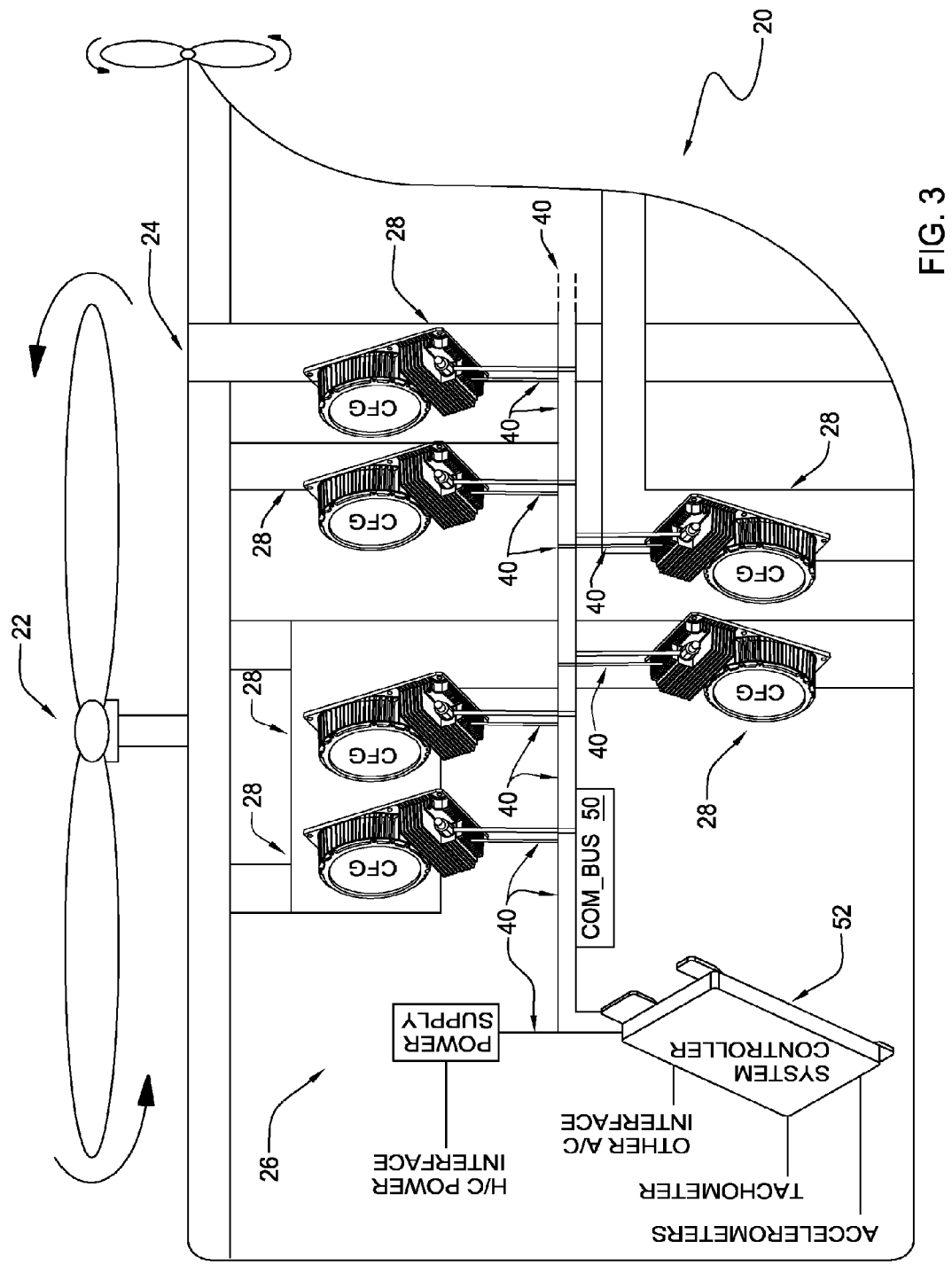
FIG. 3 illustrates a rotary wing aircraft with a distributed active vibration control system with electromagnetic force generators for suppressing vibrations.
Figure 4:
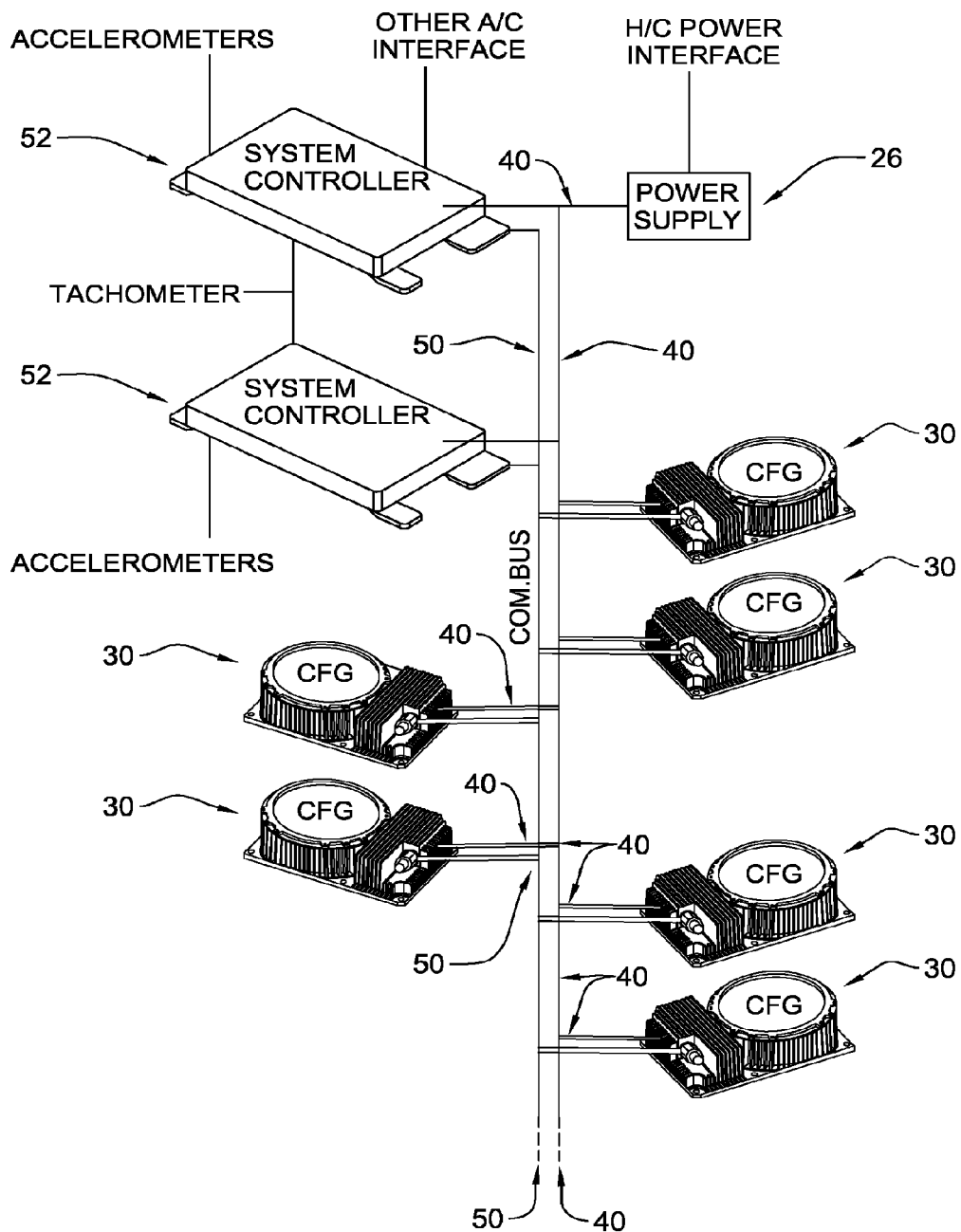
FIG. 4 illustrates a distributed active vibration control system with electromagnetic force generators for suppressing vibrations.
Figure 5:
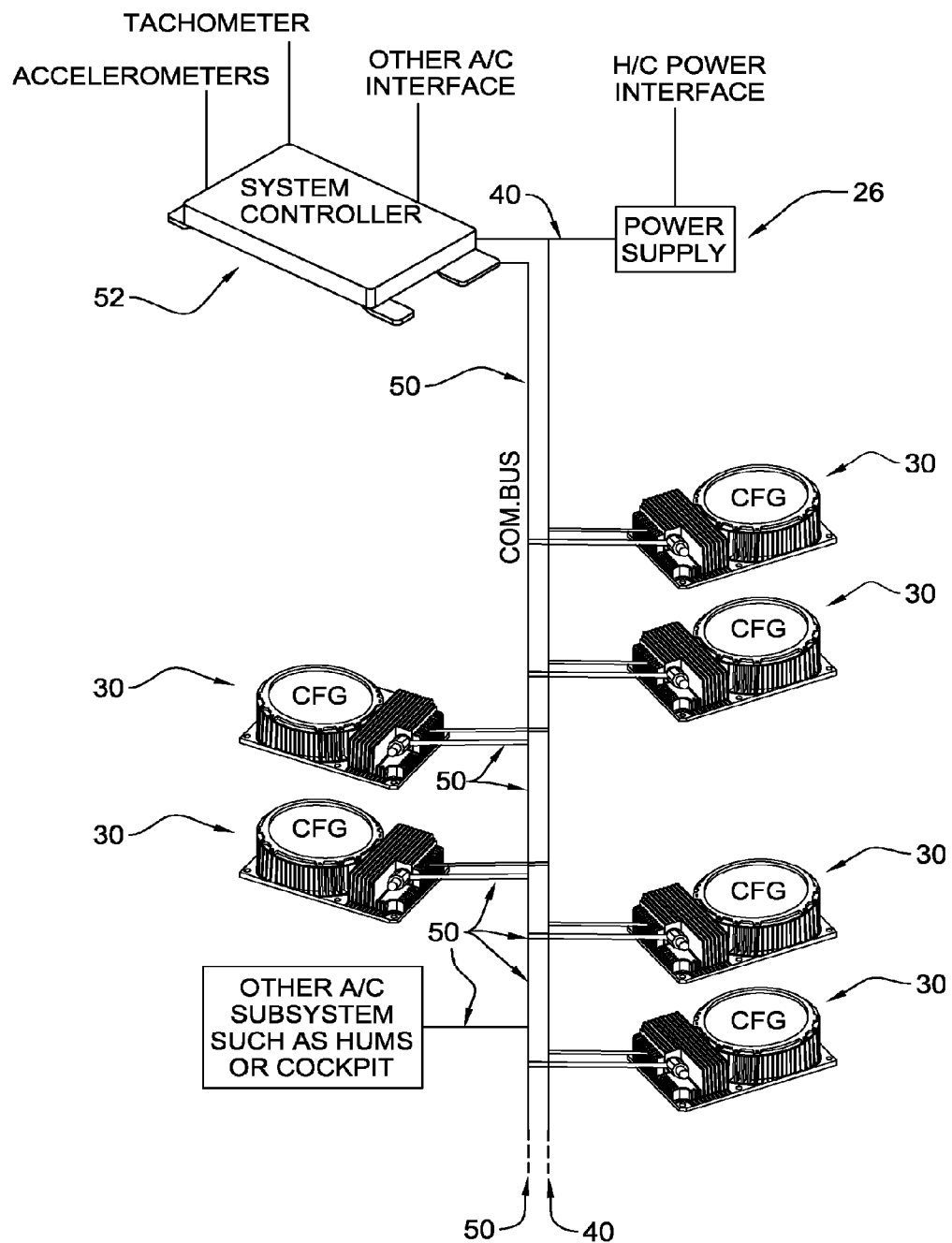
FIG. 5 illustrates a distributed active vibration control system with electromagnetic force generators for suppressing vibrations.
Figure 6:
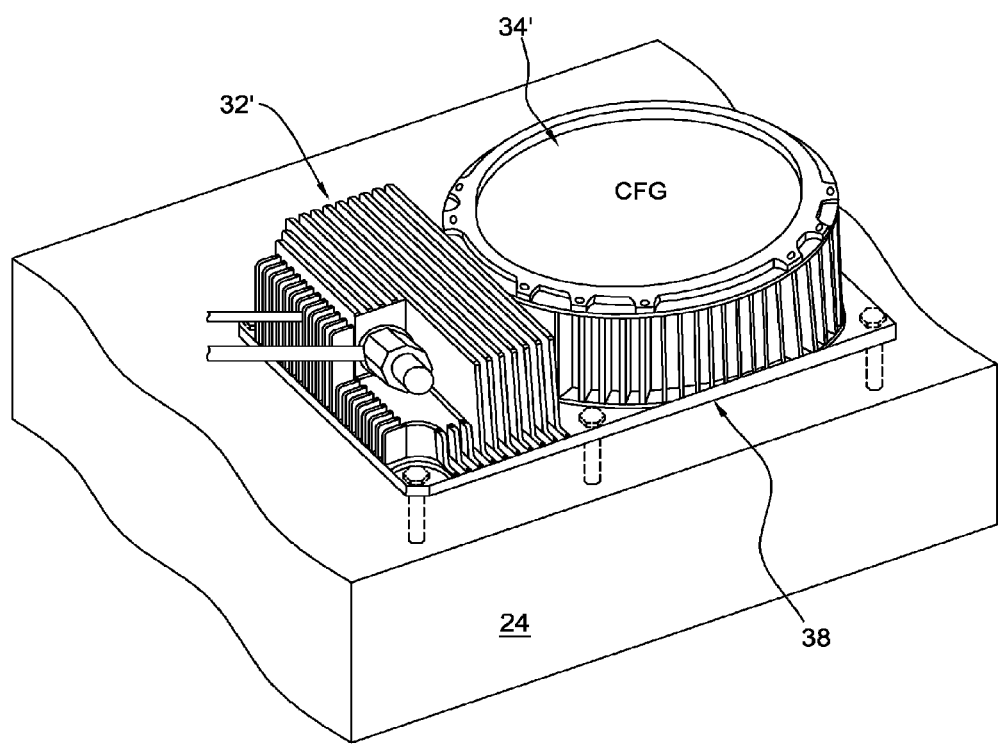
FIG. 6 illustrates a distributed active vibration electromagnetic force generator mounted to a structure with the distributed active vibration electromagnetic force generator containing a first distributed electronic control system and an at least first electromagnetically driven mass.
Figure 7A:
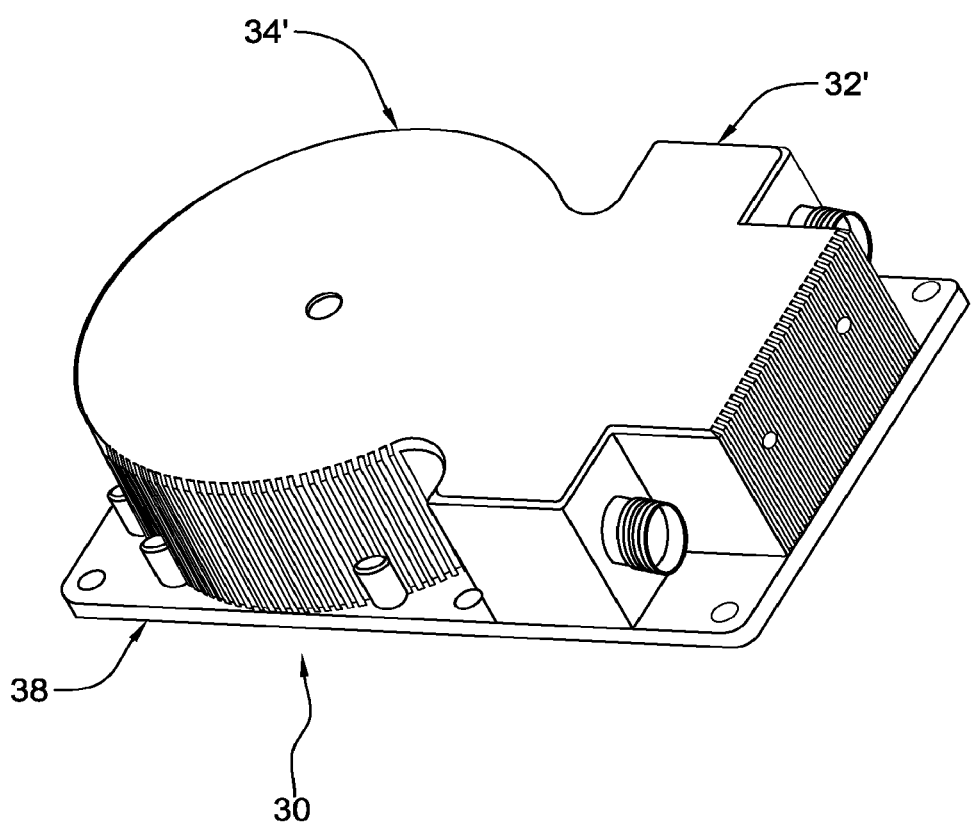
FIG. 7A-C illustrates a distributed active vibration electromagnetic force generator containing a first distributed electronic control system and an at least first electromagnetically driven mass.
Figure 7B:
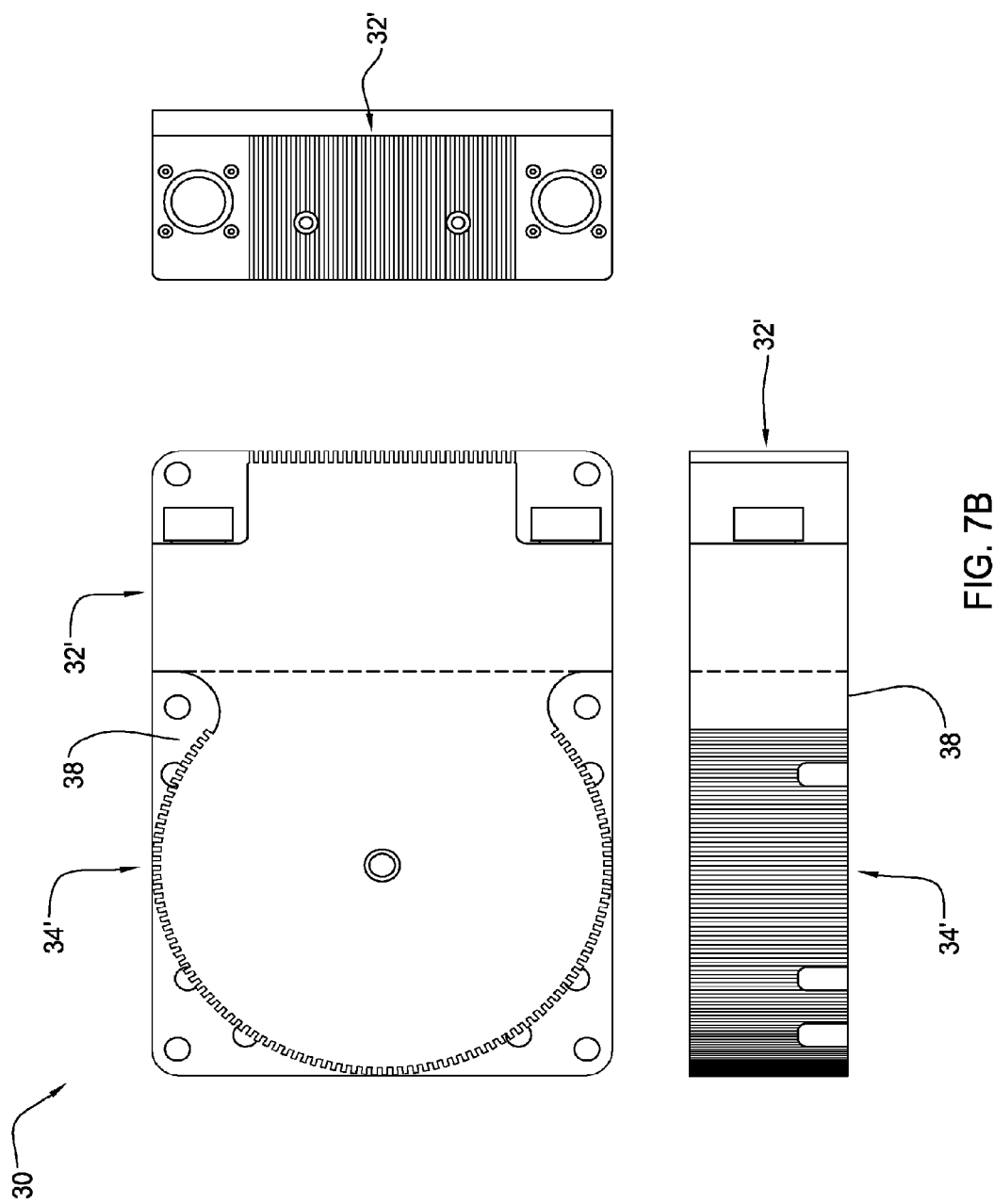
Figure 7C:
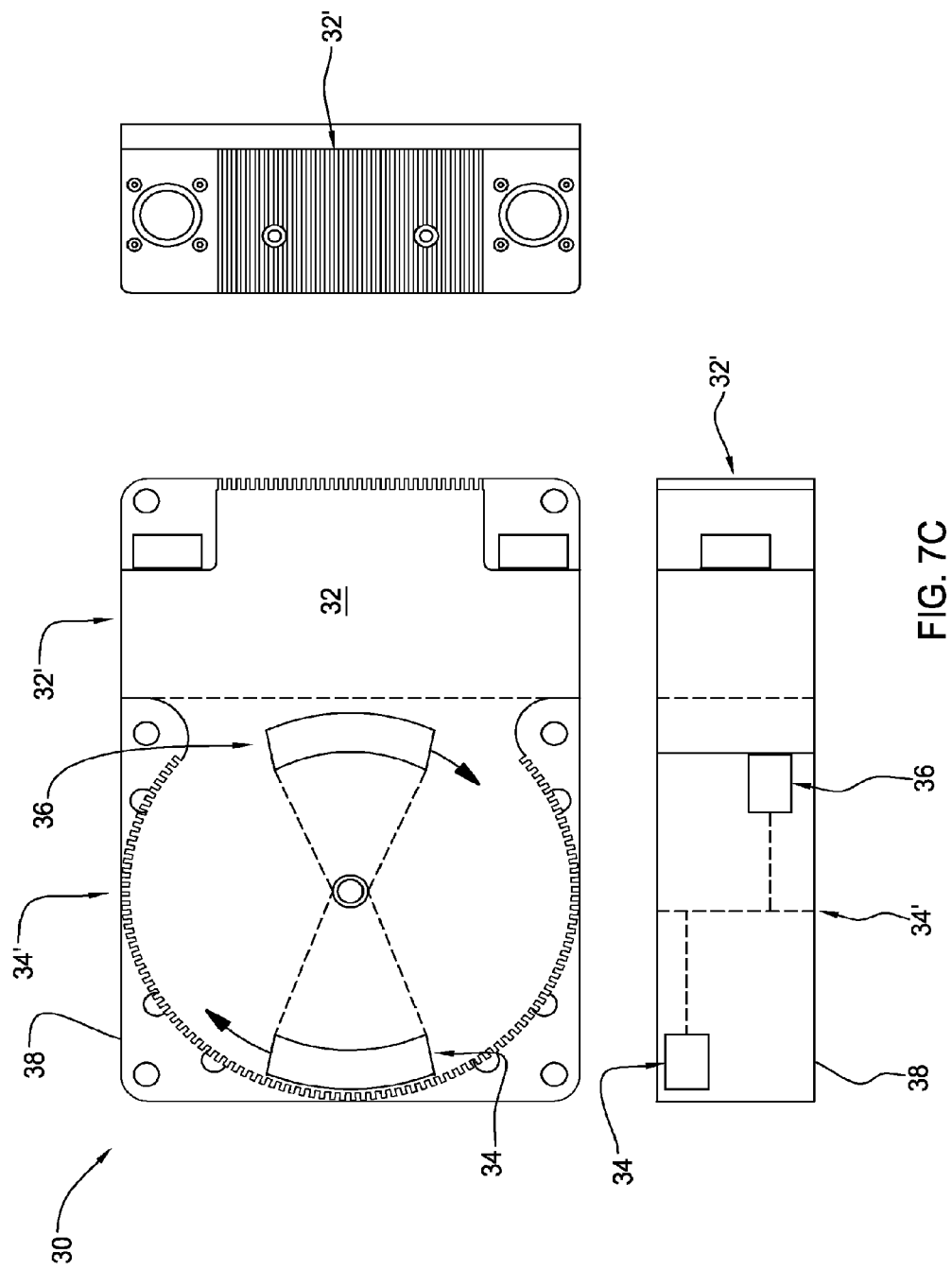
Figure 8:
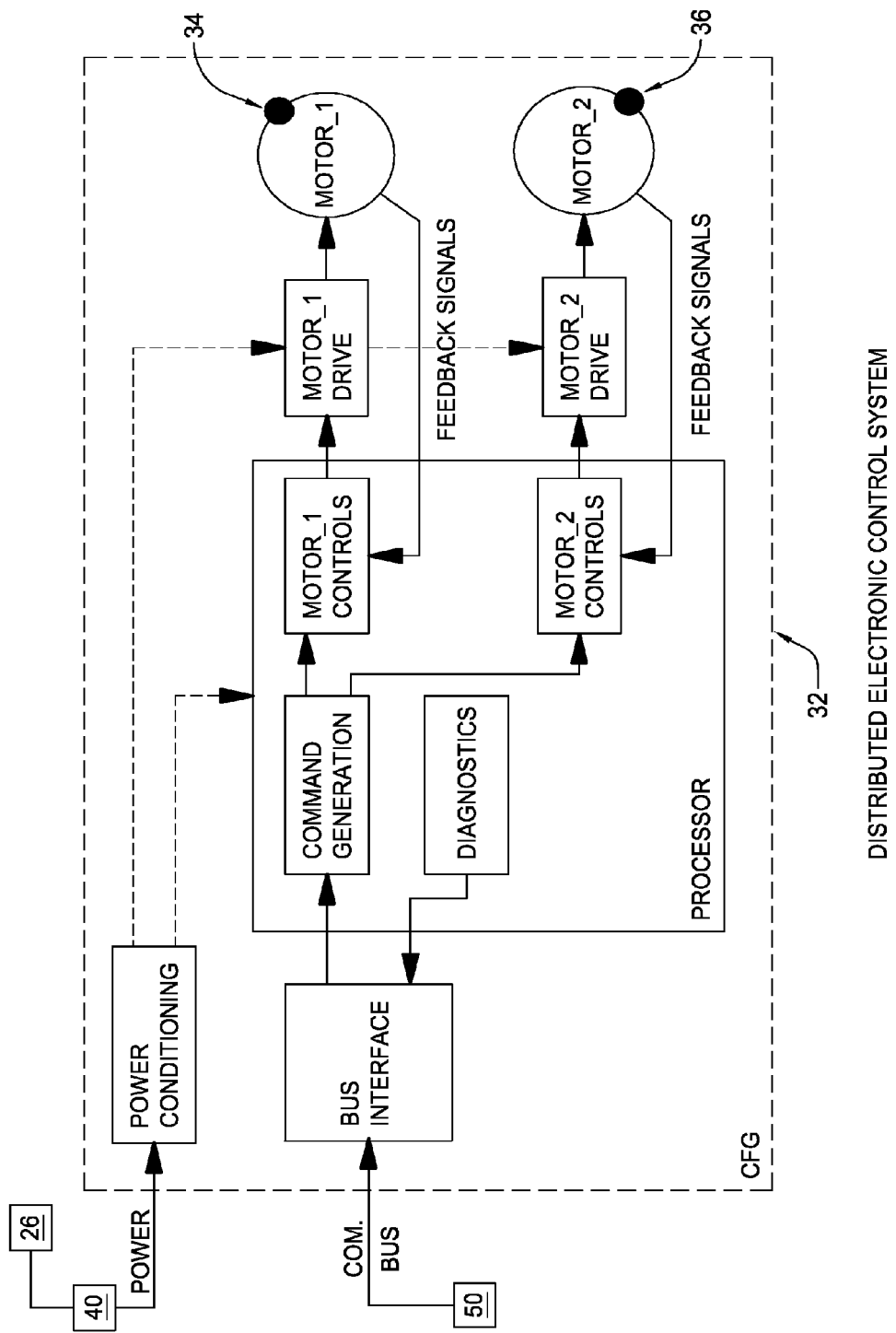
FIG. 8 illustrates a distributed electronic control system.
Figure 9:
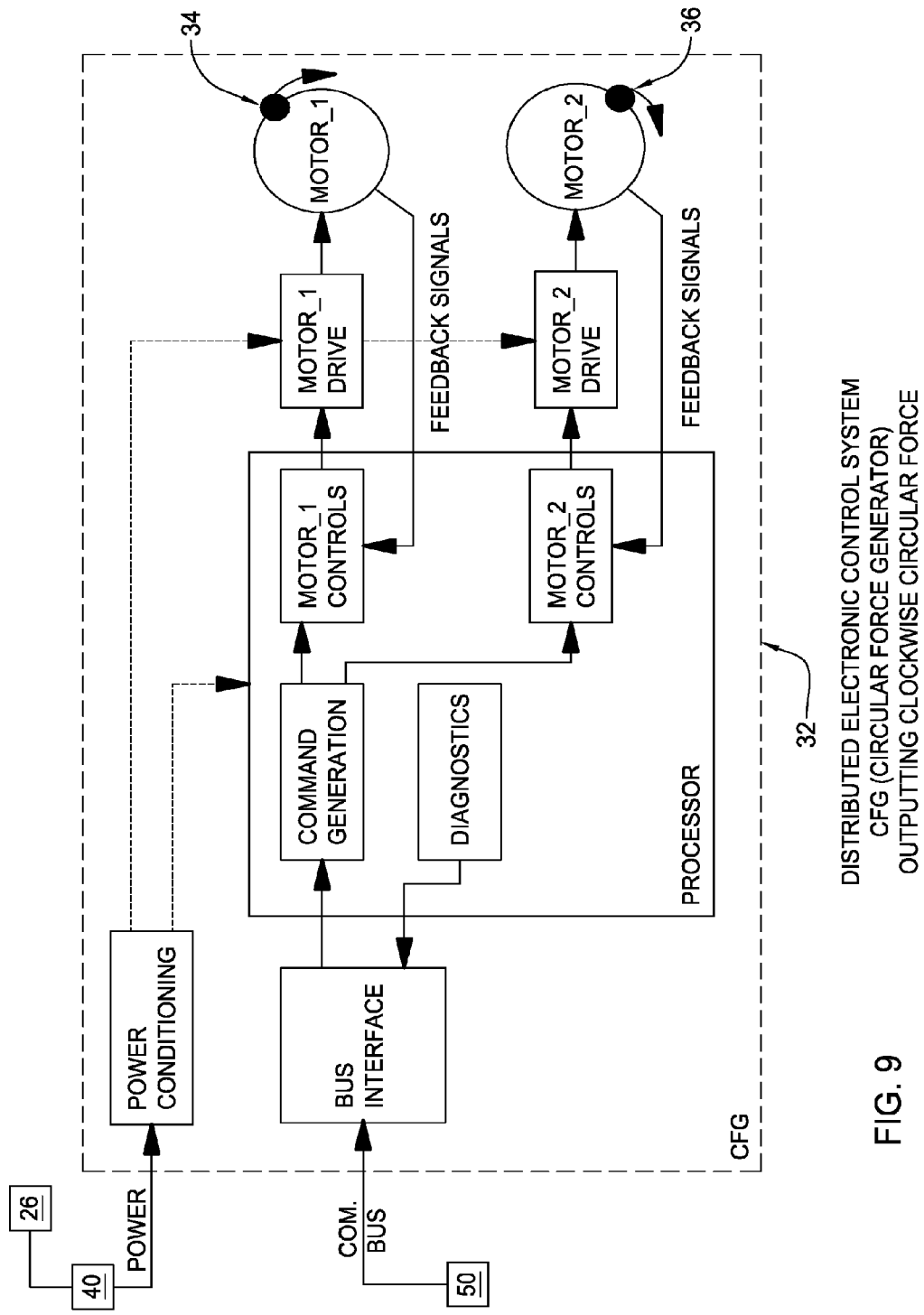
FIG. 9 illustrates a distributed electronic control system with a circular force generator (CFG) outputting clockwise circular forces.
Figure 10:
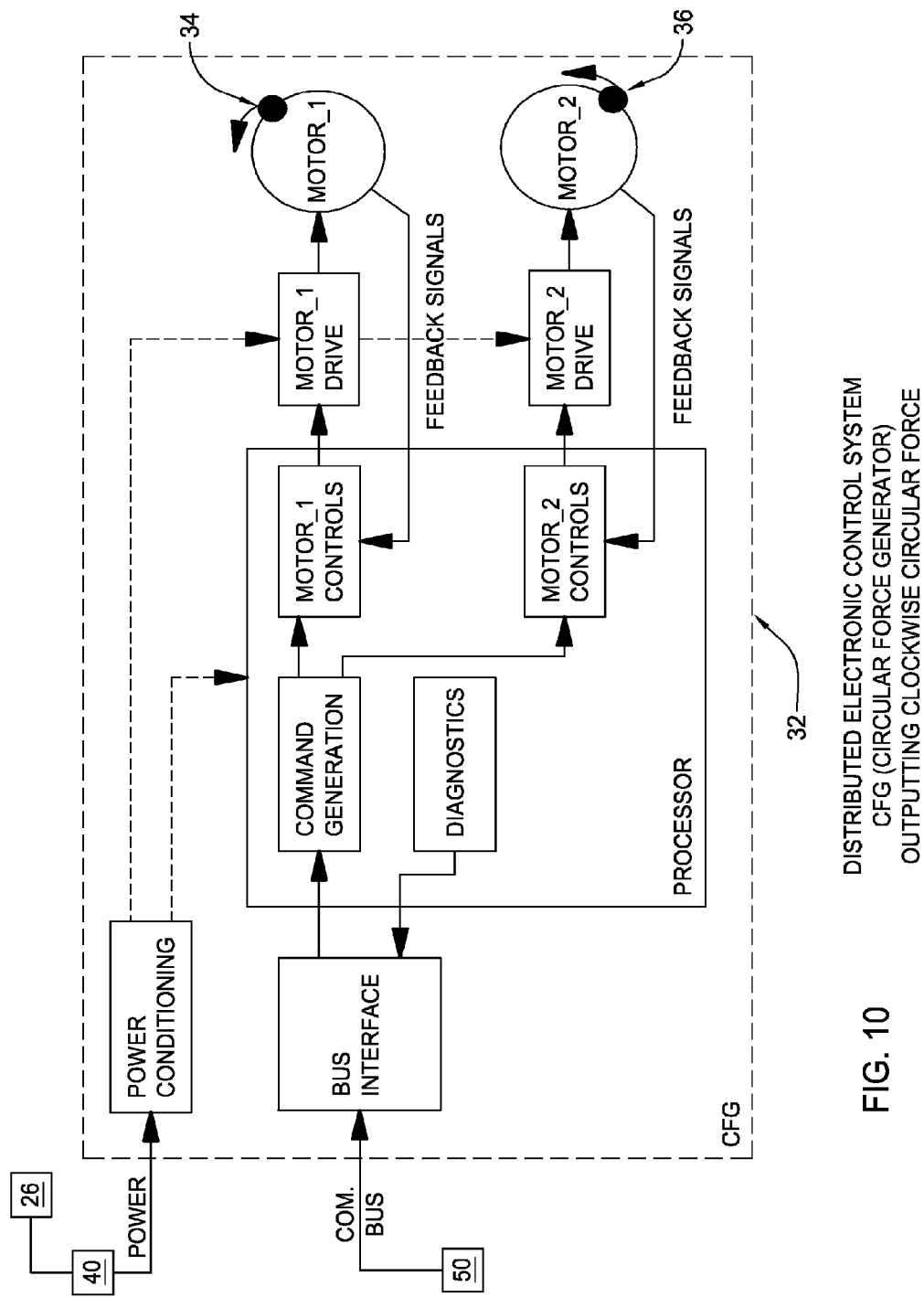
FIG. 10 illustrates a distributed electronic control system with a circular force generator (CFG) outputting counter-clockwise circular forces.
Figure 11:
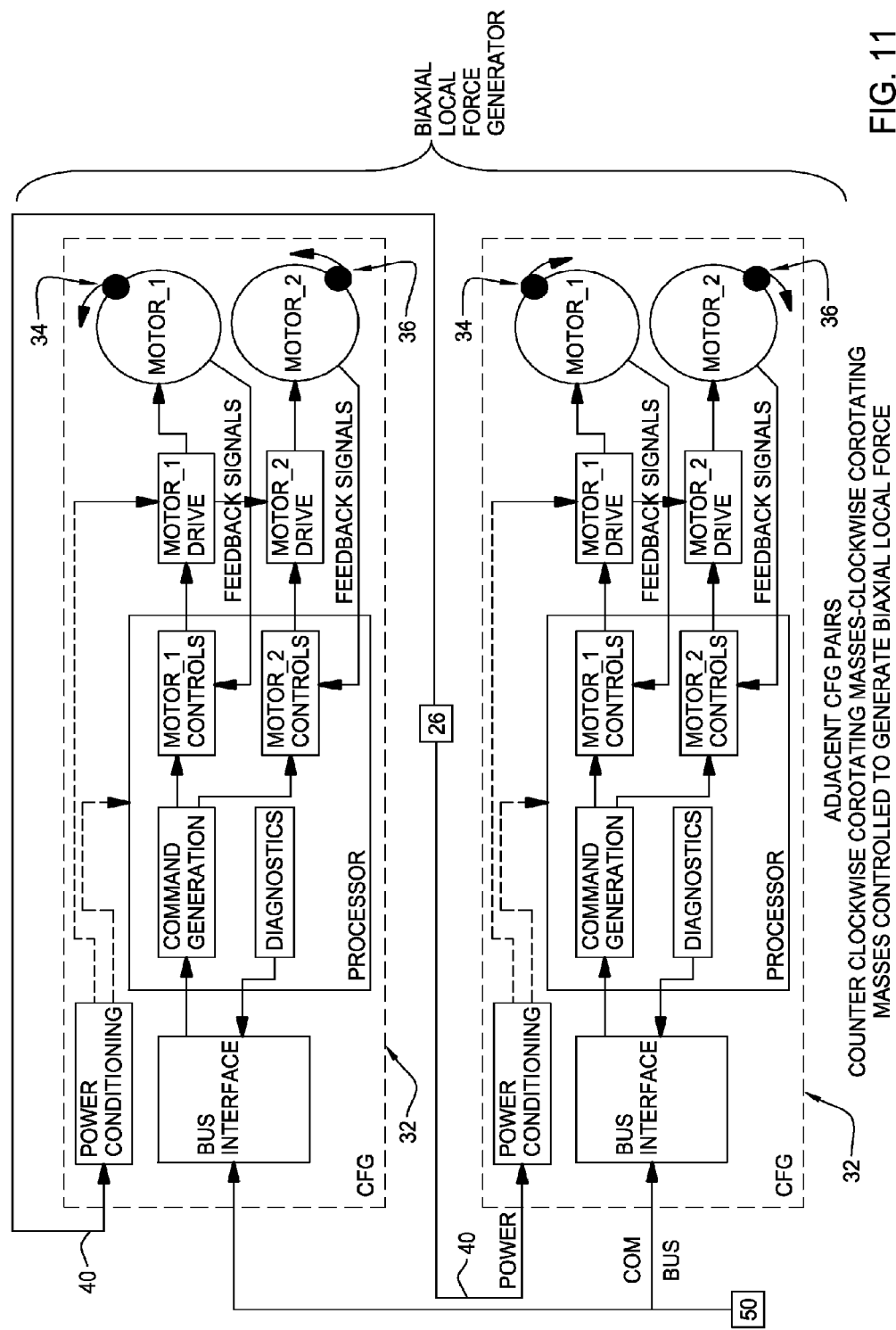
FIG. 11 illustrates distributed electronic control systems adjacent CFG pairs counter-clockwise corotating masses clockwise corotating masses controlled to generate a biaxial local force.
Figure 12:
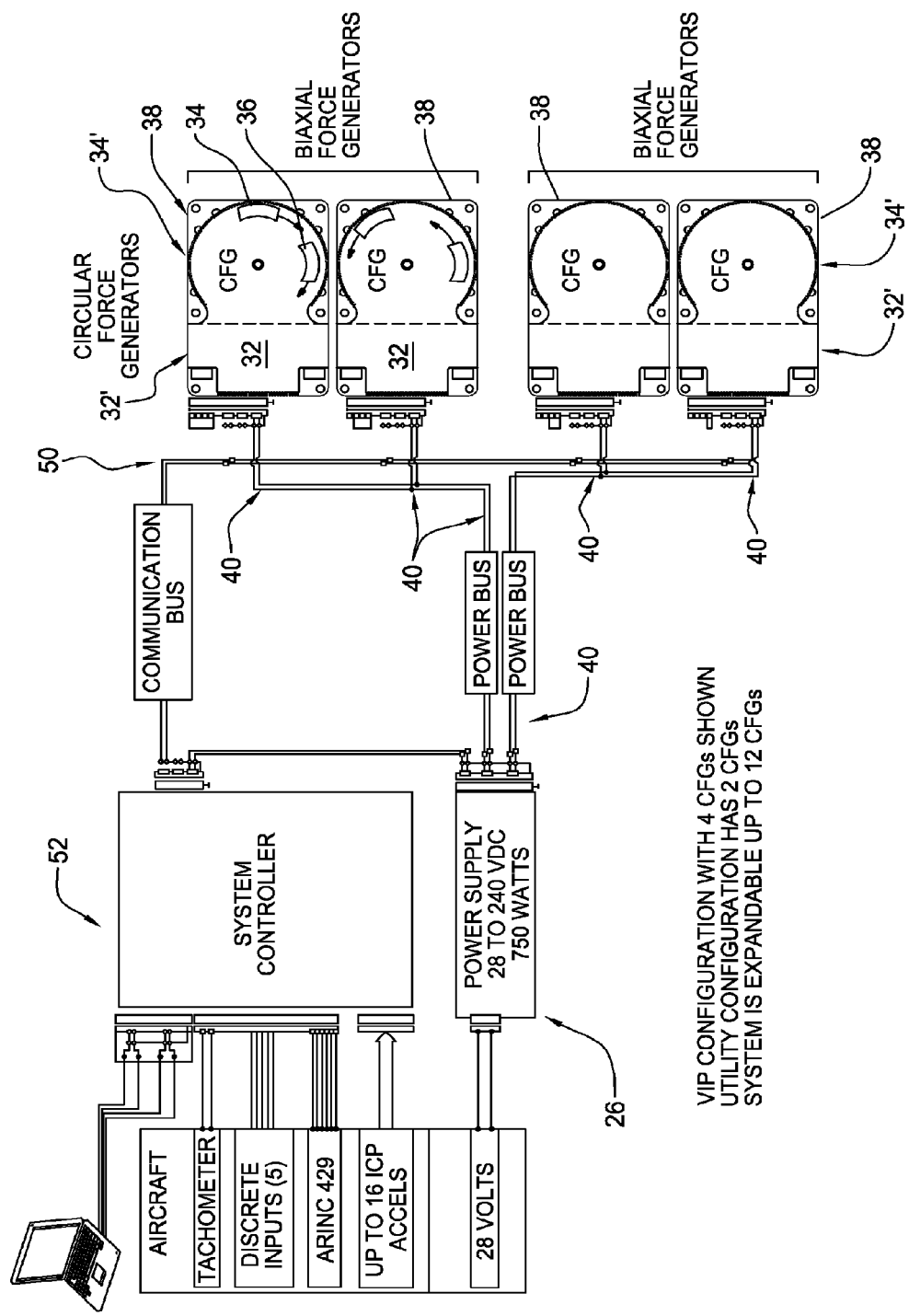
FIG. 12 illustrates a distributed active vibration control system with electromagnetic force generators for suppressing vibrations with circular force generators paired into biaxial force generators.
Figure 13:
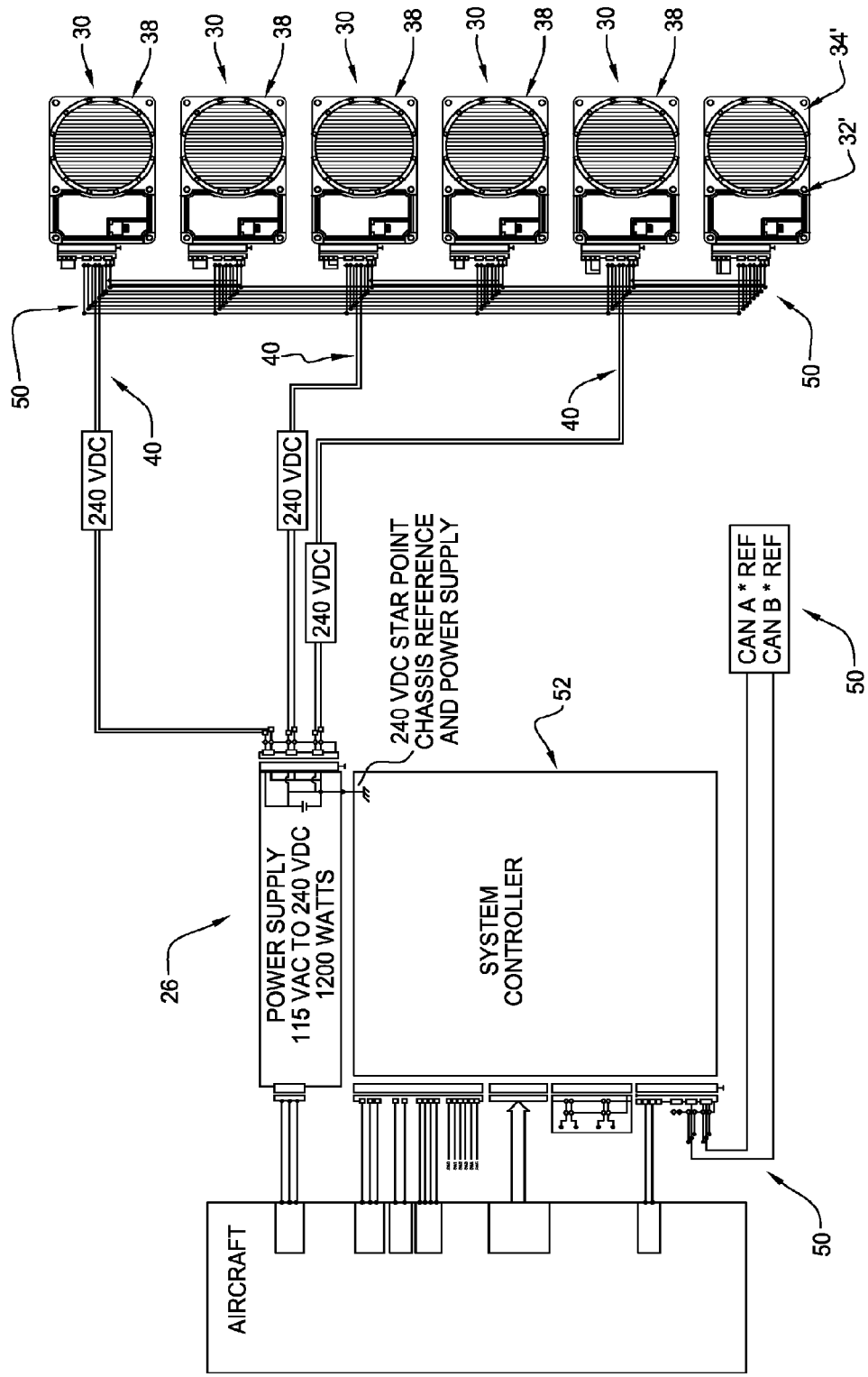
FIG. 13 illustrates a distributed active vibration control system with electromagnetic force generators for suppressing vibrations with circular force generators.
Figure 14:
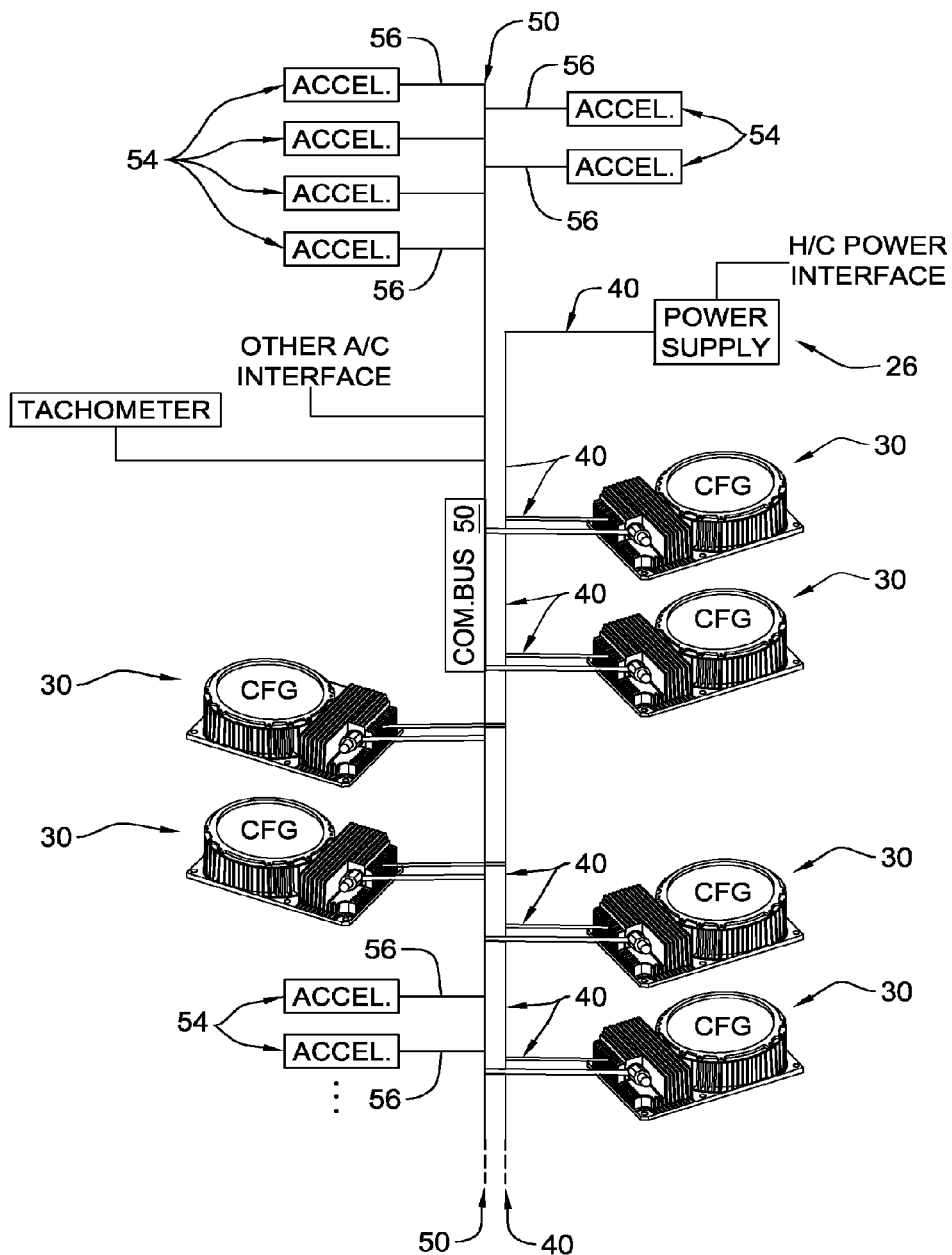
FIG. 14 illustrates a distributed active vibration control system with a migrating master system control authority.
Figure 15:
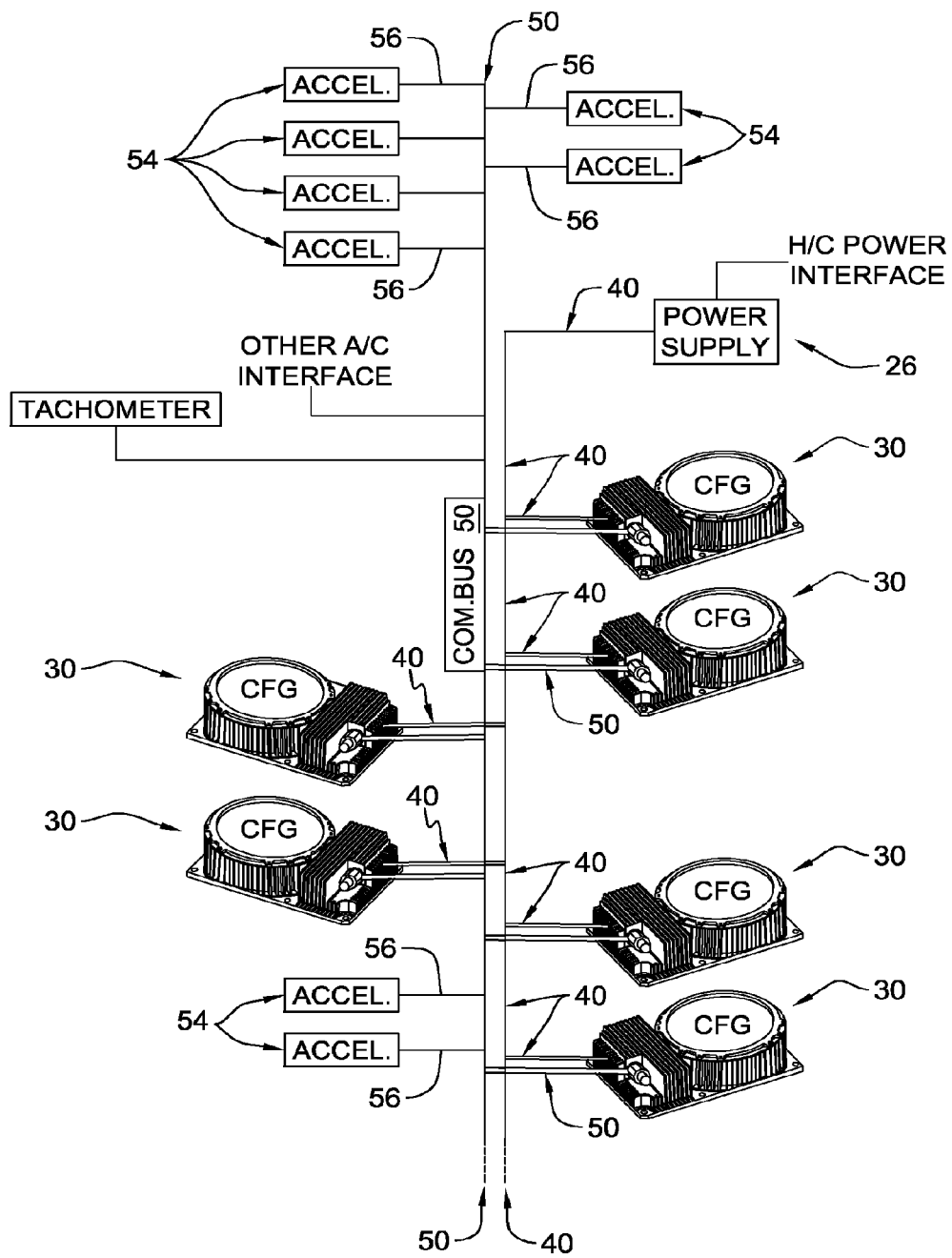
FIG. 15 illustrates a distributed active vibration control system with a distributed master system control authority.
Figure 16:
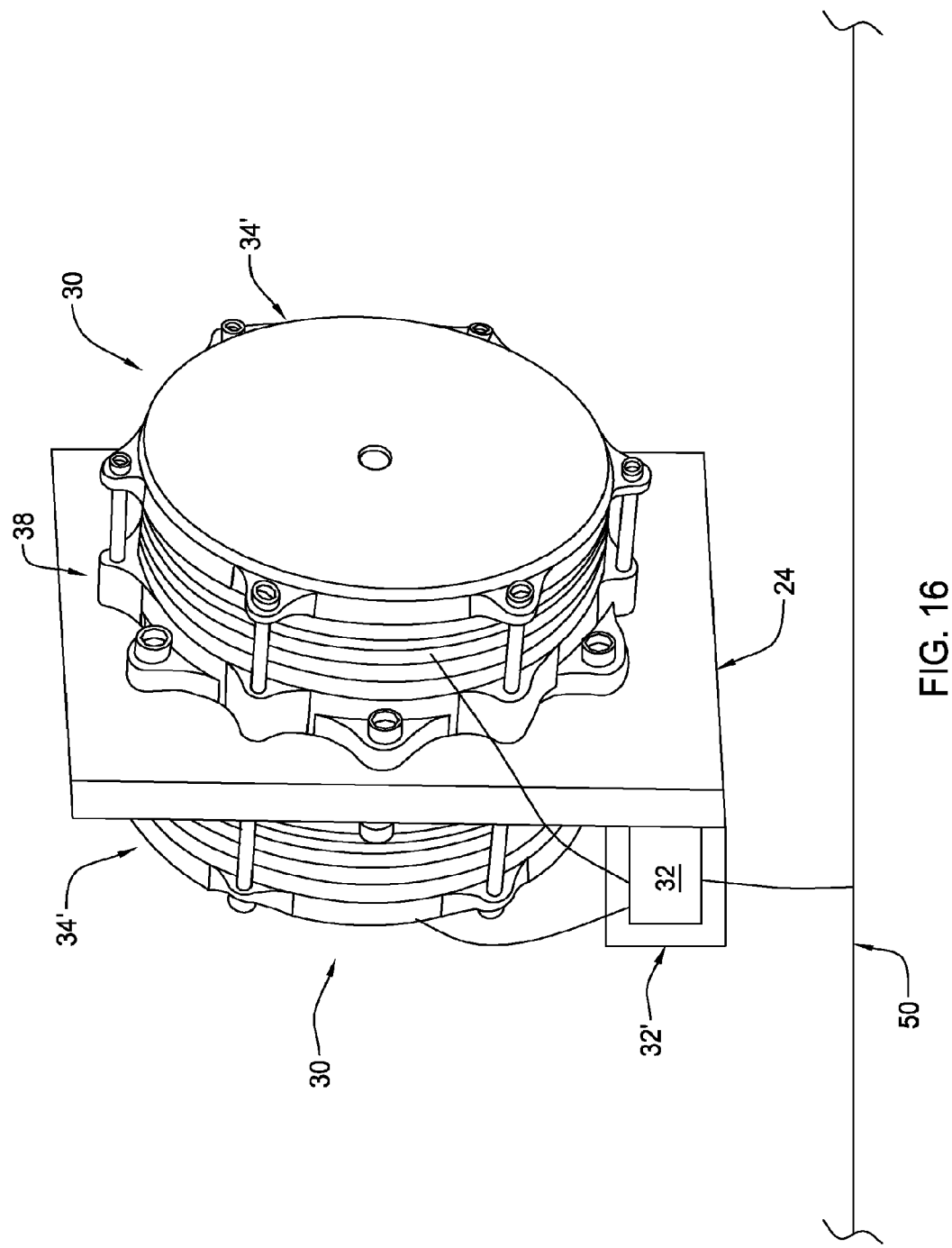
FIG. 16 illustrates a distributed active vibration control system with circular force generators with fixing bases mounted to an aerostructure.
Figure 17:
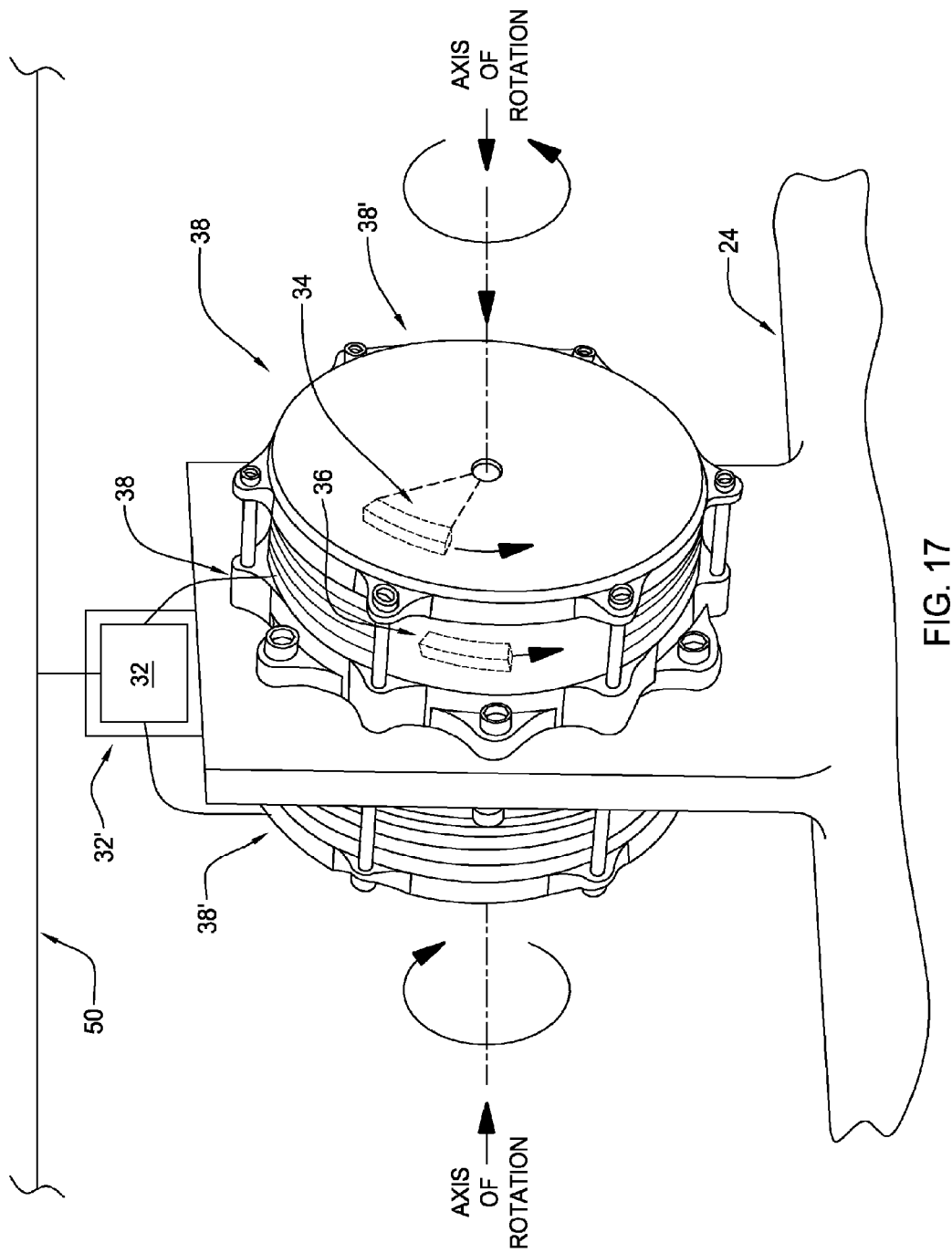
FIG. 17 shows a distributed active vibration control system with circular force generators with fixing bases mounted to an aerostructure, illustrating the axis of rotation of the electromagnetically driven masses.
Figure 18:
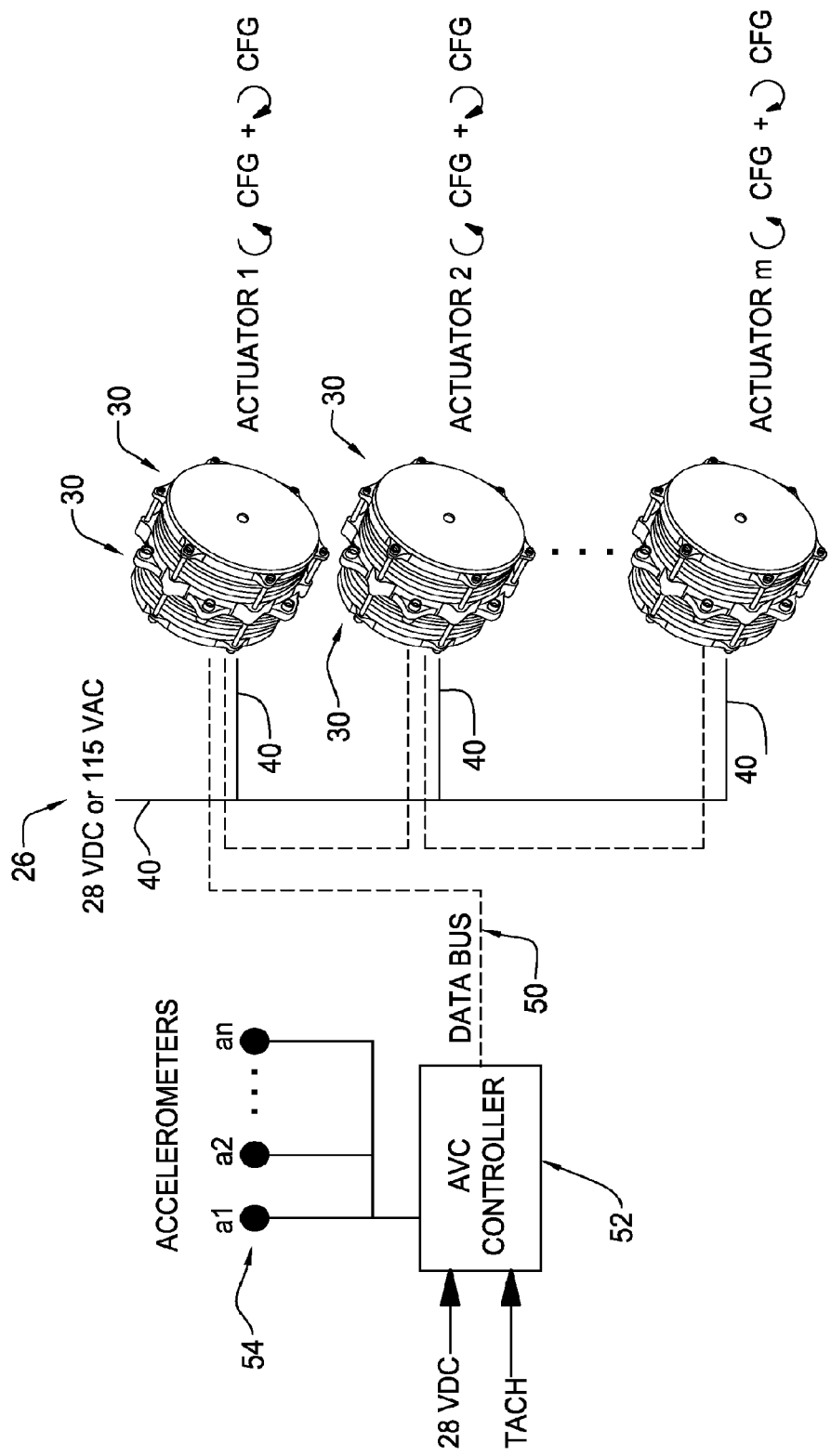
FIG. 18 illustrates a distributed active vibration control system with electromagnetic force generators for suppressing vibrations with contained/integrated/proximal distributed electronic control system drive electronics.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes an aircraft 20 with at least one rotating machine 22 creating troublesome vibrations. The aircraft 20 is comprised of an aerostructure 24. In preferred embodiments the aerostructure 24 is the frame or structural body of vehicle experiencing and transmitting the troublesome vibrations, and most preferably is a nonextensible structural body of the vehicle, preferably a nonrotating vehicle structure connected with the rotating machine 22.

The rotary wing aircraft helicopter 20 includes an active vibration control system power converter source 26 for outputting electromagnetic force generator power outputs. The aerostructure nonrotating frame 24 includes a plurality of distributed active vibration control system nodal sites 28 for mounting of force generators wherein generated forces are inputted into the aerostructure to suppress the troublesome vibrations.

The aircraft includes at least a first distributed active vibration electromagnetic force generator 30, the first distributed active vibration electromagnetic force generator 30 including a first distributed electronic control system 32 and a first electromagnetically driven mass 34, the first distributed active vibration electromagnetic force generator 30 fixed to the frame aerostructure 24 at a first distributed active vibration control system nodal site 28.

The aircraft includes at least a second distributed active vibration electromagnetic force generator 30, the second distributed active vibration electromagnetic force generator 30 including a second distributed electronic control system 32 and a second electromagnetically driven mass 34, the second distributed active vibration electromagnetic force generator fixed to the aerostructure 24 at a second distributed active vibration control system nodal site 28 preferably distal from the first distributed active vibration control system nodal site 28.

Preferably the aircraft includes at least a third distributed active vibration electromagnetic force generator 30, the third distributed active vibration electromagnetic force generator 30 including a third distributed electronic control system 32 and a third electromagnetically driven mass 34, the third distributed active vibration electromagnetic force generator 30 fixed to the aerostructure 24 at a third distributed active vibration control system nodal site 28, preferably distal from the first and second force generator aerostructure mounting force input nodal sites 28 where the first and second force generators 30 input their generated forces into the aerostructure 24.

Preferably the aircraft includes at least two force generators 30 fixed at two force generator aerostructure mounting force input nodal sites 28, and preferably at least three separated distributed active vibration control system force generators 30 fixed to the aerostructure at three separated force generator aerostructure mounting force input nodal sites 28. In preferred embodiments the aircraft includes at least four separated distributed active vibration control system force generators 30 fixed to the aerostructure at four separated force generator aerostructure mounting force input nodal sites 28. In preferred embodiments the aircraft includes at least five separated distributed active vibration control system force generators 30 fixed to the aerostructure at five separated force generator aerostructure mounting force input nodal sites 28. In preferred embodiments the aircraft includes at least six separated distributed active vibration control system force generators 30 fixed to the aerostructure at six separated force generator aerostructure mounting force input nodal sites 28. In embodiments the distributed active vibration control system force generators 30 fixed to the aerostructure proximate to each other in pairs, preferably to provide a local area biaxial force generator, most preferably with a first counterclockwise circular force generator CFG 30 paired proximate to a second clockwise circular force generator CFG 30 to provide a local aerostructure biaxial force generator (Biaxial FG). Preferably the aircraft vehicle distributed vibration control system is an expandable aircraft vehicle distributed vibration control system with N nodal sites 28 with N distributed active vibration control system force generators 30, with the system expandable by adding an additional Nth force generator 30 fixed at the Nth nodal site 28, preferably with the system limited by aircraft space/weight limits and electrical power available on the aircraft.

Preferably the distributed active vibration electromagnetic force generators 30 include a first containment chamber 32' containing the first distributed electronic control system 32. Preferably the distributed active vibration electromagnetic force generators 30 include a containment chamber 34' containing the at least first electromagnetically driven mass 34. In preferred embodiments the second containment chamber 34' is an adjacent second containment chamber, preferably separated from first containment chamber 32'. In preferred embodiments the second containment chamber 34' contains first electromagnetically driven mass 34 and second corotating electromagnetically driven mass 36. Preferably the distributed active vibration electromagnetic force generators 30 include a common fixing base 38 joining the adjacent first distributed electronic control system containment chamber and the a second electromagnetically driven mass containment chamber, the fixing base 38 providing for mounting of the distributed active vibration electromagnetic force generators 30 to the aerostructure 24 and the inputting of the generated force into the aerostructure 24. In a preferred embodiment the fixing base 38 has a fixing base plane in alignment with the corotating electromagnetically driven masses 34 and 36 parallel planes of rotation in the containment chamber 34' and with the planar fixing base plane normal to the axis of rotation of the corotating electromagnetically driven masses 34 and 36 of the distributed active vibration electromagnetic force generator 30. The distributed force generators 30 are packaged with the distributed electronic control systems and the electromagnetically driven masses contained with the mounting fixing base to be fixed to the aerostructure at the nodal sites 28 such as with mechanical fixtures such as bolts, with the moving mass force outputted through the base 38 into the aerostructure 24, with the moving masses contained in second containment chamber 34' and distributed electronic control systems contained in separated and adjacent first containment chambers 32'.

The aircraft includes a plurality of electrical power distribution lines 40, the electrical power distribution lines 40 connecting the electromagnetic force generators 30 with the power source 26 with the electromagnetic force generator power outputs outputted to the electromagnetic force generators.

The aircraft includes a distributed expandable force generator data communications network 50, the distributed force generator data communications network 50 linking together the at least first and second distributed electronic control systems 32 wherein the distributed electronic control systems 32 communicate force generator vibration control data through the distributed force generator data communications network 50 independently of the electrical power distribution lines 40 to minimize the troublesome vibrations. Preferably each node has a unique address on the network 50, with the force generating data distributed through the network 50 with the unique network address, preferably the unique node address# along with the force data, such as a magnitude and phase of a force to be generated by the electromagnetic force generator 30 having the unique data communications node network address (or the unique data communications node network address with a real and imaginary force generation values). In preferred embodiments the distributed expandable force generator data communications network 50 is a wired data communications network, and preferably is comprised of a communication bus and with a harness interface connector connecting each electromagnetic force generator's distributed electronic control system 32 with the network 50, with the distributed electronic control systems 32 both sending and receiving force generating system data through the network 50. In preferred embodiments the distributed expandable force generator data communications network 50 is a Controller Area Network, with the distributed electronic control systems 32 including microcontrollers communicating with each other through the network along with the microcontrollers in the system controller. Preferably the distributed electronic control systems 32 also communicate system health data such as whether a force generator 30 is healthy or not healthy. Preferably the force generator network node address and its accompanying force generation data (network node#_magnitude_phase) flows throughout the network 50 and is shared on the network with all network nodes and all electromagnetic force generators 30.

In an embodiment the aircraft includes a master system controller 52, the master system controller 52 connected to the distributed force generator data communications network 50 wherein the master system controller 52 provides a plurality of authority commands to the at least first and second distributed electronic control systems 32, with the at least first and second distributed electronic control systems 32 executing a plurality of subordinate local force generator operation commands. Preferably the subordinate local force generator operation commands depend on the type of force generator. In preferred embodiments the force generators 30, are rotating mass force generators, preferably with the subordinate local force generator operation commands commanding electromagnetic motor rotations of corotating electromagnetically driven masses 34 and 36. In preferred embodiments an electromagnetic force generator's distributed electronic control system 32 receive its network node address and its accompanying force generation data (network node#_magnitude_phase) from which its microcontroller computes electromagnetic motor rotations for the corotating electromagnetically driven masses 34 and 36 to output a desired circular force into aerostructure 24 through the fixing base 38, with the force generators 30 preferably comprised of circular force generators outputting circular forces into aerostructure 24 at their respective fixing base nodal sites 28.

In an embodiment the aircraft includes a migrating master system control authority, the migrating master system control authority movable between the at least first and second distributed electronic control systems 32 of the plurality of force generators 30, with the migrating master system control authority providing a plurality of authority commands to the distributed electronic control systems 32 to execute a plurality of subordinate local force generator operation commands such as shown in the FIG. (Migrating Master System Control Authority), preferably without a separate distinct physical head master System Controller. With the migrating master system control authority at any one point in time preferably the system has a master control authority taking up temporary residence in a distributed electronic control system 32, which includes executable software and/or firmware commands that provide a physically headless control system with distributed control of the system with the ability of backup command with migration movement of authority. Preferably the system includes distributed networked accelerometers 54, with the distributed networked accelerometers including microcontrollers having accelerometer network links 56 with the distributed expandable force generator data communications network 50. The accelerometers input and output vibration measurement data into the force generator data communications network, preferably with the plurality of accelerometers inputting data into the network (and receiving data from the network) with the accelerometers each having a unique network node address #, with the accelerometers including an accelerometer distributed network electronic control system for data interfacing with the network. In a preferred embodiment the accelerometer network links 56 are wired links, and preferably the accelerometers are powered through the communications bus wired network links 56. In an alternative embodiment the accelerometers are wireless networked accelerometers providing wireless transmission of accelerometer data measurements sent to the network 50 for determination on how to minimize troublesome vibrations with the accelerometers powered by alternative means such as with batteries or with power supplied from aircraft power supply outlets or power supply 26.

In an embodiment the aircraft includes a distributed master system control authority. The distributed master system control authority is distributed among the at least first and second distributed electronic control systems 32 utilizing the network 50 with the distributed master system control authority providing a plurality of authority commands to the individual distributed electronic control systems 32 to execute a plurality of subordinate local force generator operation commands, such as shown in the FIG. (Distributed Master System Control Authority). Preferably at any one point in time the system has a master control authority spread out in at least two distributed electronic control systems 32, and includes executable software and/or firmware commands that provide a physically headless system with distributed control of the system with backup control with the plurality of distributed electronic control systems 32 on the network 50. Preferably the system includes distributed networked accelerometers 54, with the distributed networked accelerometers including microcontrollers having accelerometer network links 56 with the distributed expandable force generator data communications network 50. The accelerometers input and output vibration measurement data into the force generator data communications network, preferably with the plurality of accelerometers inputting data into the network (and receiving data from the network) with the accelerometers each having a unique network node address #, with the accelerometers including an accelerometer distributed network electronic control system for data interfacing with the network. In a preferred embodiment the accelerometer network links 56 are wired links, and preferably the accelerometers are powered through the communications bus wired network links 56. In an alternative embodiment the accelerometers are wireless networked accelerometers providing wireless transmission of accelerometer data measurements sent to the network 50 for determination on how to minimize troublesome vibrations with the accelerometers powered by alternative means such as with batteries or with power supplied from aircraft power supply outlets or power supply 26.

In an embodiment the aircraft includes at least a first distributed networked accelerometer 54. The accelerometer outputs can be inputted directly into the network 50 or into system controller 52. Preferably the at least first distributed networked accelerometer 54 has an accelerometer network link 56 with the distributed expandable force generator data communications network 50. The accelerometers are fixed to the aircraft, preferably fixed to the aerostructure 24, and measure vibrations in the aerostructure. The accelerometers sense and measure the troublesome vibrations created by the rotating machinery 22 and the forces generated by the force generators 30 that are outputted into aerostructure 24 and are transmitted through the aerostructure and are measurable by the accelerometer. The accelerometer measurements of vibrations are used as control inputs to drive down and minimize the troublesome vibrations. The accelerometers input and output vibration measurement data into the force generator data communications network, preferably with the plurality of accelerometers inputting data into the network (and receiving data from the network) with the accelerometers each having a unique network node address #, with the accelerometers including an accelerometer distributed network electronic control system for data interfacing with the network. In a preferred embodiment the accelerometer network links 56 are wired links, and preferably the accelerometers are powered through the communications bus wired network links 56. In an alternative embodiment the accelerometers are wireless networked accelerometers providing wireless transmission of accelerometer data measurements sent to the network 50 for determination on how to minimize troublesome vibrations with the accelerometers powered by alternative means such as with batteries or with power supplied from aircraft power supply outlets or power supply 26. The accelerometer data measurements are shared through the network 50 and used in the system controllers, processors, and electronic control systems in the determination of controlling the electromagnetic driving of the moving masses to generate the forcesto minimize the troublesome vibrations.

In preferred embodiments the first distributed electronic control system 32 executes a plurality of local force generator operation rotating motor commands to rotate at least its first electromagnetic motor to move its at least first mass 34, and the second distributed electronic control system 32 executes a plurality of local force generator operation rotating motor commands to rotate at least its first electromagnetic motor to move its at least first mass 34. Preferably the plurality of distributed active vibration force generators 30 are circular force generating distributed active vibration force generators with the distributed electronic control systems 32 executing a plurality of local force generator operation rotating motor control commands to drive first motor (Motor_1) to corotate mass 34 and second motor (Motor_2) such as shown in FIG. (Distributed Electronic Control System) to corotate mass 36 to generate a circular force which is outputted through the base 38 into aerostructure 24 as a rotating circular force. As shown in FIG. (Distributed Electronic Control System CFG (Circular Force Generator) Outputting Counter Clockwise Circular Force) the distributed electronic control systems 32 has a network bus interface with the data communications network bus through which force generation data is communicated, with the distributed electronic control systems 32 executing a plurality of local force generator operation commands. The circular force generator processor command generation outputs commands to first motor controls (Motor_1 Controls) and second motor controls (Motor_2 Controls). The first motor controls control a first motor drive (Motor_1 Drive) to counterclockwise rotate first mass 34 with first motor (Motor_1). The second motor controls control a second motor drive (Motor_2 Drive) to counterclockwise rotate second corotating mass 36 with second motor (Motor_2). Motor 1 and Motor 2 are corotated to generate a counterclockwise circular force. As shown in FIG. (Distributed Electronic Control System CFG (Circular Force Generator) Outputting Clockwise Circular Force) the distributed electronic control systems 32 has a network bus interface with the data communications network bus through which force generation data is communicated, with the distributed electronic control systems 32 executing a plurality of local force generator operation commands. The circular force generator processor command generation outputs commands to first motor controls (Motor_1 Controls) and second motor controls (Motor_2 Controls). The first motor controls control a first motor drive (Motor_1 Drive) to clockwise rotate first mass 34 with first motor (Motor_1). The second motor controls control a second motor drive (Motor_2 Drive) to clockwise rotate second corotating mass 36 with second motor (Motor_2). Motor 1 and Motor 2 are corotated to generate a clockwise circular force.

As shown in FIG. (Adjacent CFG Pairs CounterClockwise Corotating Masses—Clockwise Corotating Masses Controlled to Generate Biaxial Local Force) the distributed electronic control systems 32 have a network bus interfaces with the data communications network 50 through which force generation data is communicated, with the distributed electronic control systems 32 executing a plurality of local force generator operation commands. The upper circular force generator processor command generation outputs commands to first motor controls (Motor_1 Controls) and second motor controls (Motor_2 Controls). The first motor controls control a first motor drive (Motor_1 Drive) to counterclockwise rotate first mass 34 with first motor (Motor_1). The second motor controls control a second motor drive (Motor_2 Drive) to counterclockwise rotate second corotating mass 36 with second motor (Motor_2). Motor 1 and Motor 2 are corotated to generate a counterclockwise circular force. The lower distributed electronic control system executes a plurality of local force generator operation commands, with the circular force generator processor command generation outputs commands to first motor controls (Motor_1 Controls) and second motor controls (Motor_2 Controls). The first motor controls control a first motor drive (Motor_1 Drive) to clockwise rotate first mass 34 with first motor (Motor_1). The second motor controls control a second motor drive (Motor_2 Drive) to clockwise rotate second corotating mass 36 with second motor (Motor_2). Motor 1 and Motor 2 are corotated to generate a clockwise circular force. With these two controlled circular force generators 30 fixed proximate to each other on aerostructure 24 the vibration control system through data network 50 produces a local area biaxial force, with the pair of adjacent CFGs 30 communicating through the network 50 to provide a local biaxial force generator in aerostructure 24.

Preferably the at least first distributed active vibration electromagnetic force generator 30 inputs a first circular force into the aerostructure frame 24 at a first distributed active vibration control system nodal site 28, and the at least second distributed active vibration electromagnetic force generator 30 inputs a second circular force into the aerostructure frame 24 at a second distributed active vibration control system nodal site 28.

Preferably the at least first distributed active vibration electromagnetic force generator 30 includes a fixing base 38 and a first containment chamber 32' containing the first distributed electronic control system 32 and a second containment chamber 34' containing the at least first electromagnetically driven mass 34 and the at least second distributed active vibration electromagnetic force generator 30 includes a fixing base 38 and a first containment chamber 32' containing the second distributed electronic control system 32 and a second containment chamber 34' containing the at least second electromagnetically driven mass 34. Preferably the distributed force generators are packaged with base 38 to be fixed to the aerostructure 24 with the moving mass force outputted through the base 38 into the aerostructure 24, with the at least one moving mass contained in second containment chamber and the distributed electronic control system contained in the separated and adjacent first containment chamber.

Figure 19B:
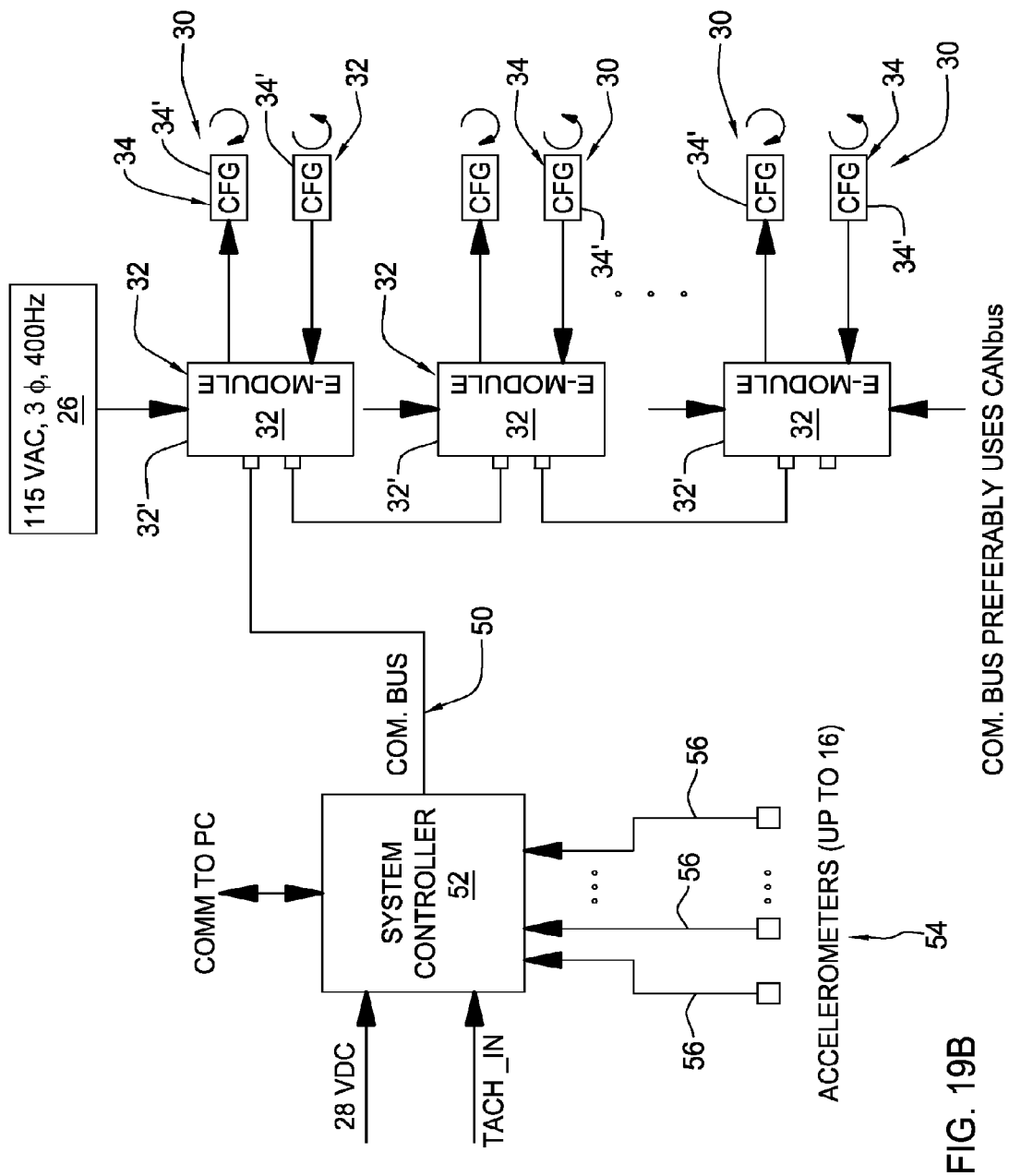
Figure 19C:
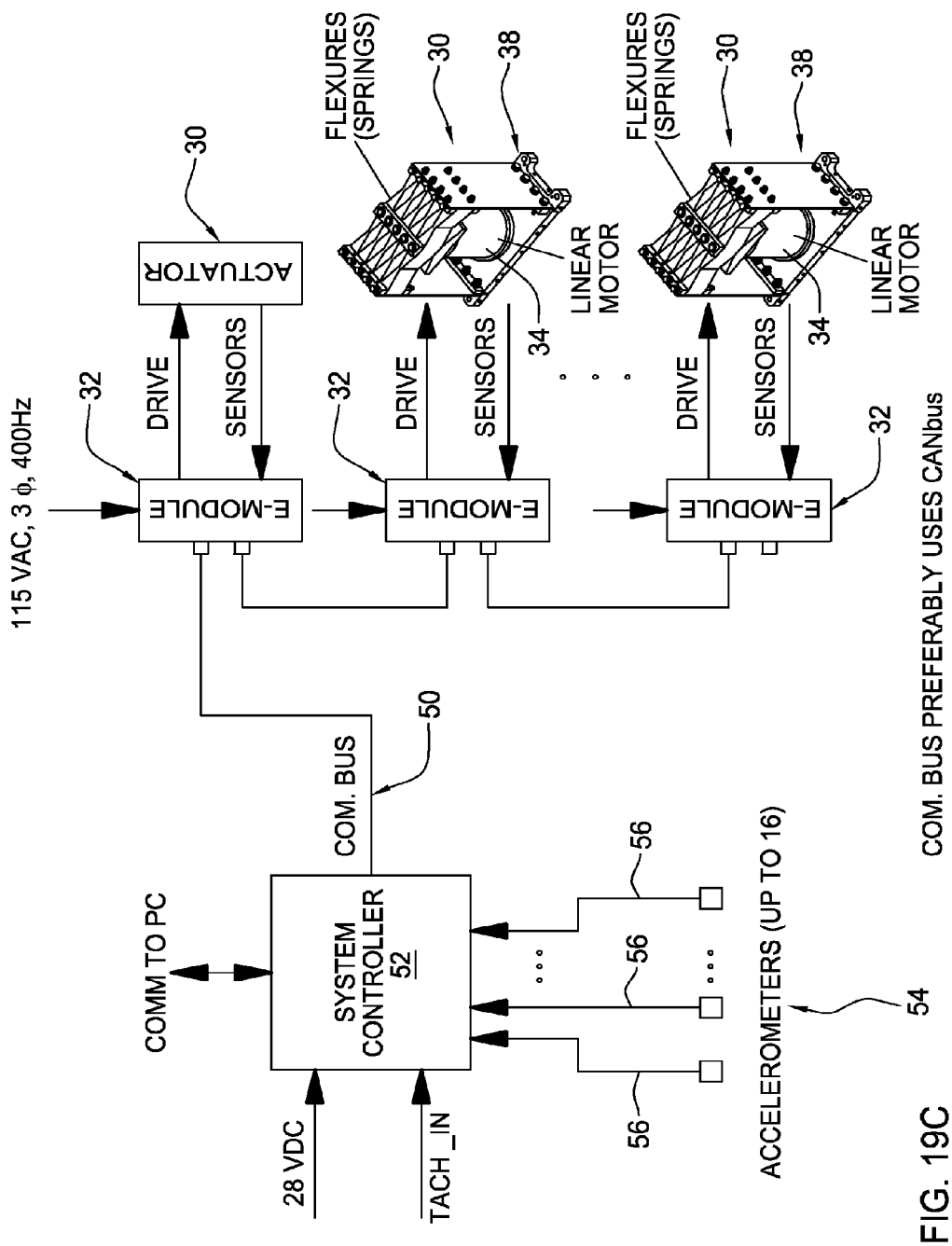
Figure 20A:
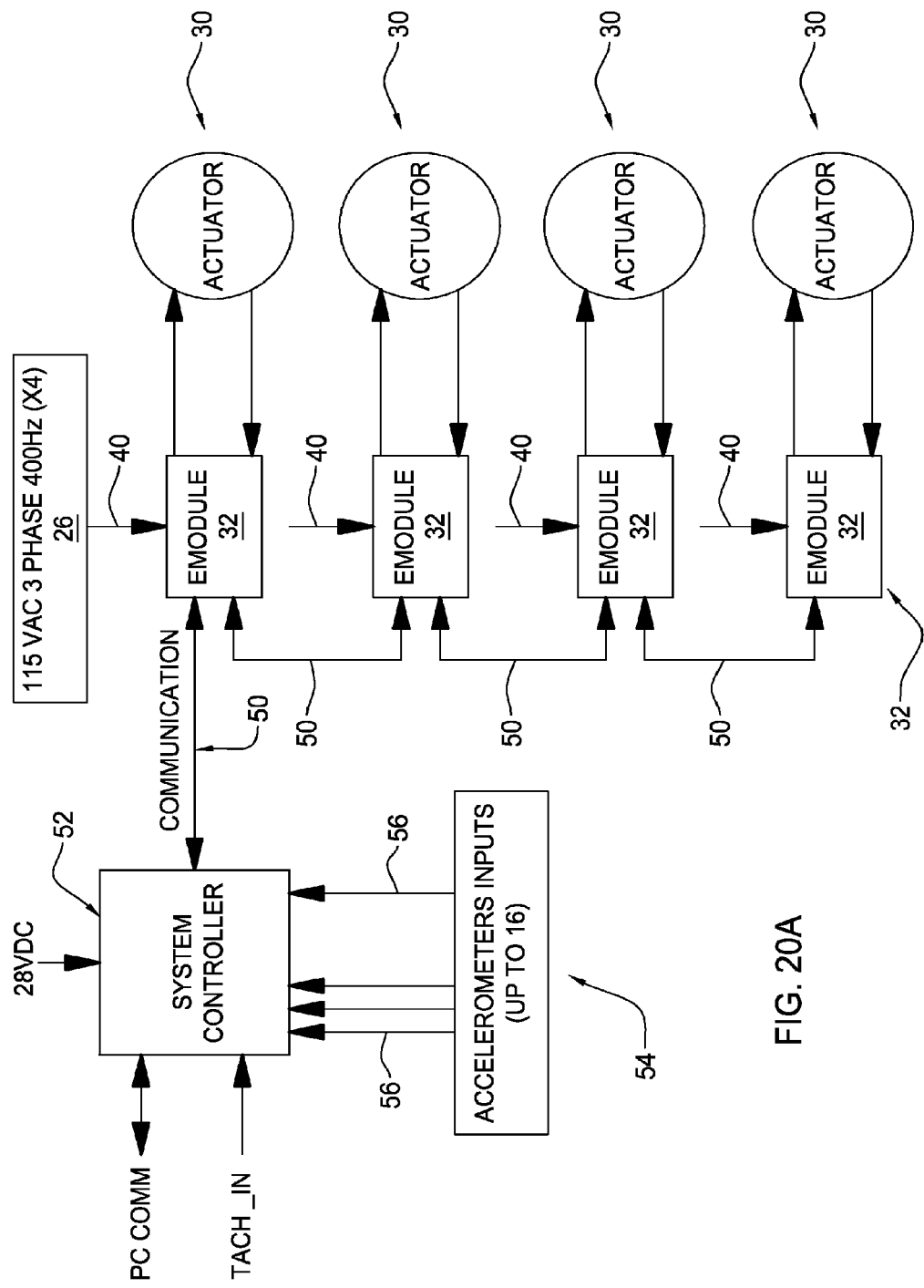
FIG. 20A-B illustrates distributed active vibration control systems with electromagnetic force generators for suppressing vibrations with a communications bus and electronics modules.
Figure 20B:
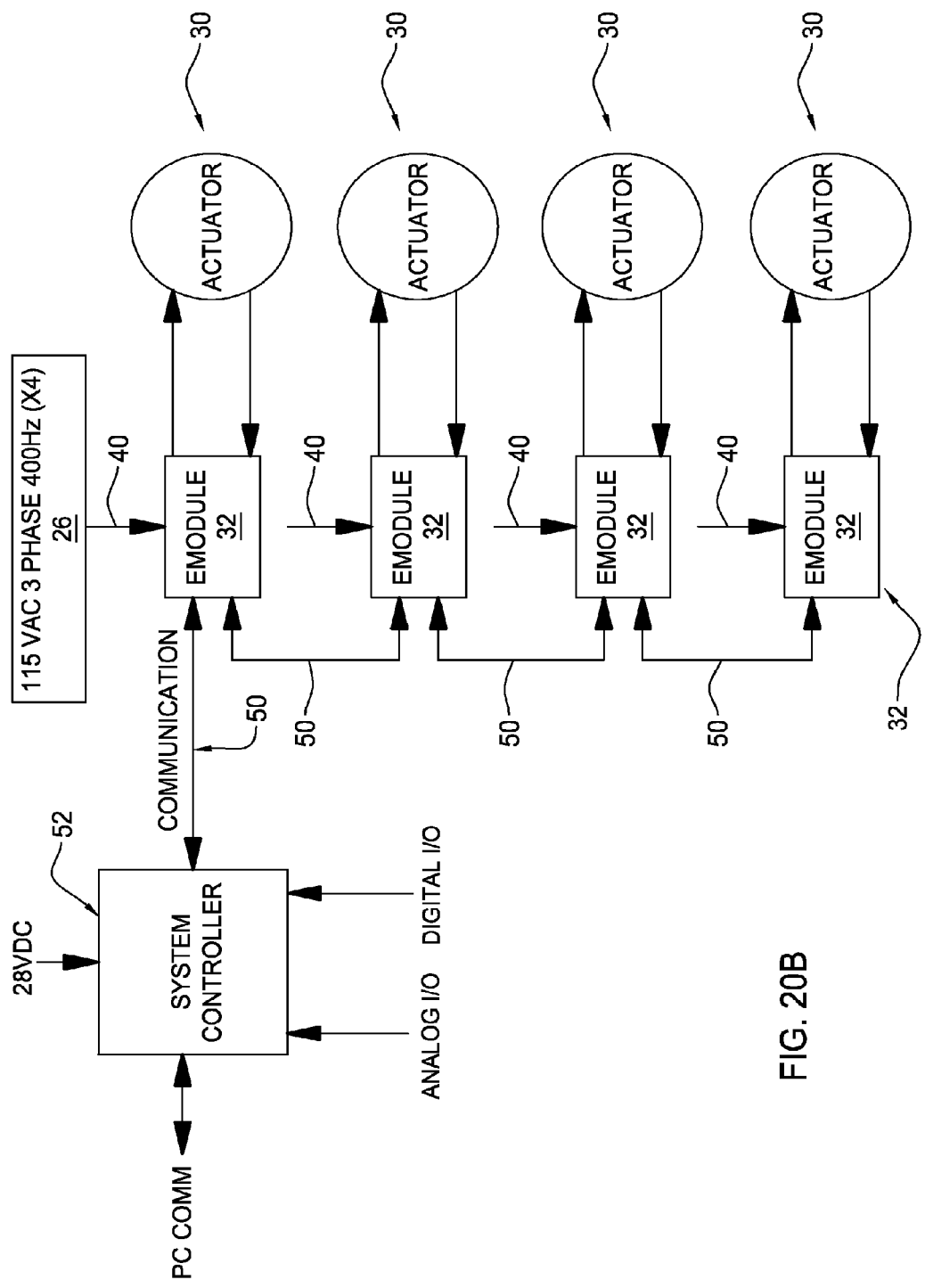
Figure 21A:
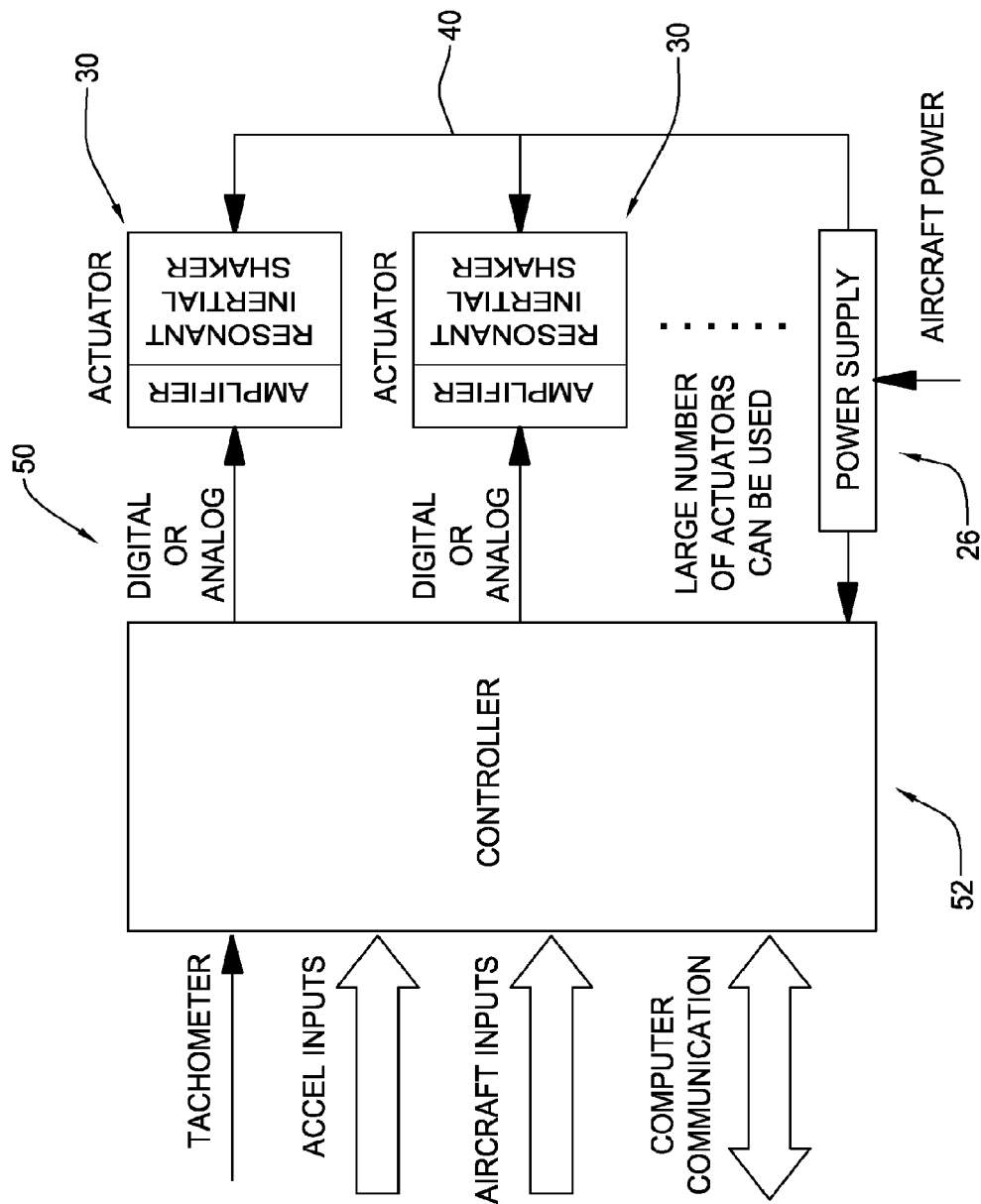
FIG. 21A-C illustrates distributed active vibration control systems with electromagnetic force generators for suppressing vibrations.
Figure 21B:
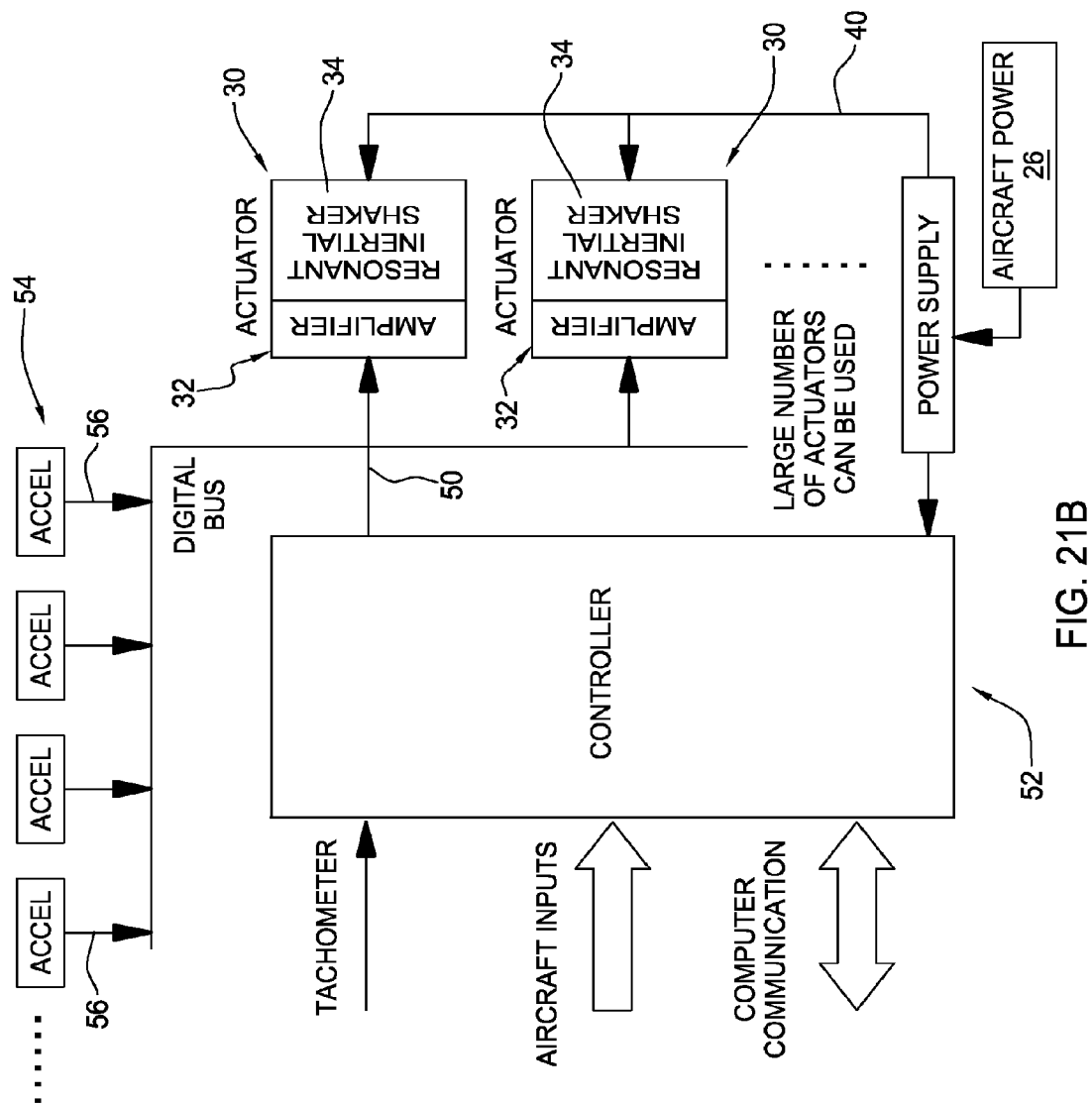
Figure 21C:
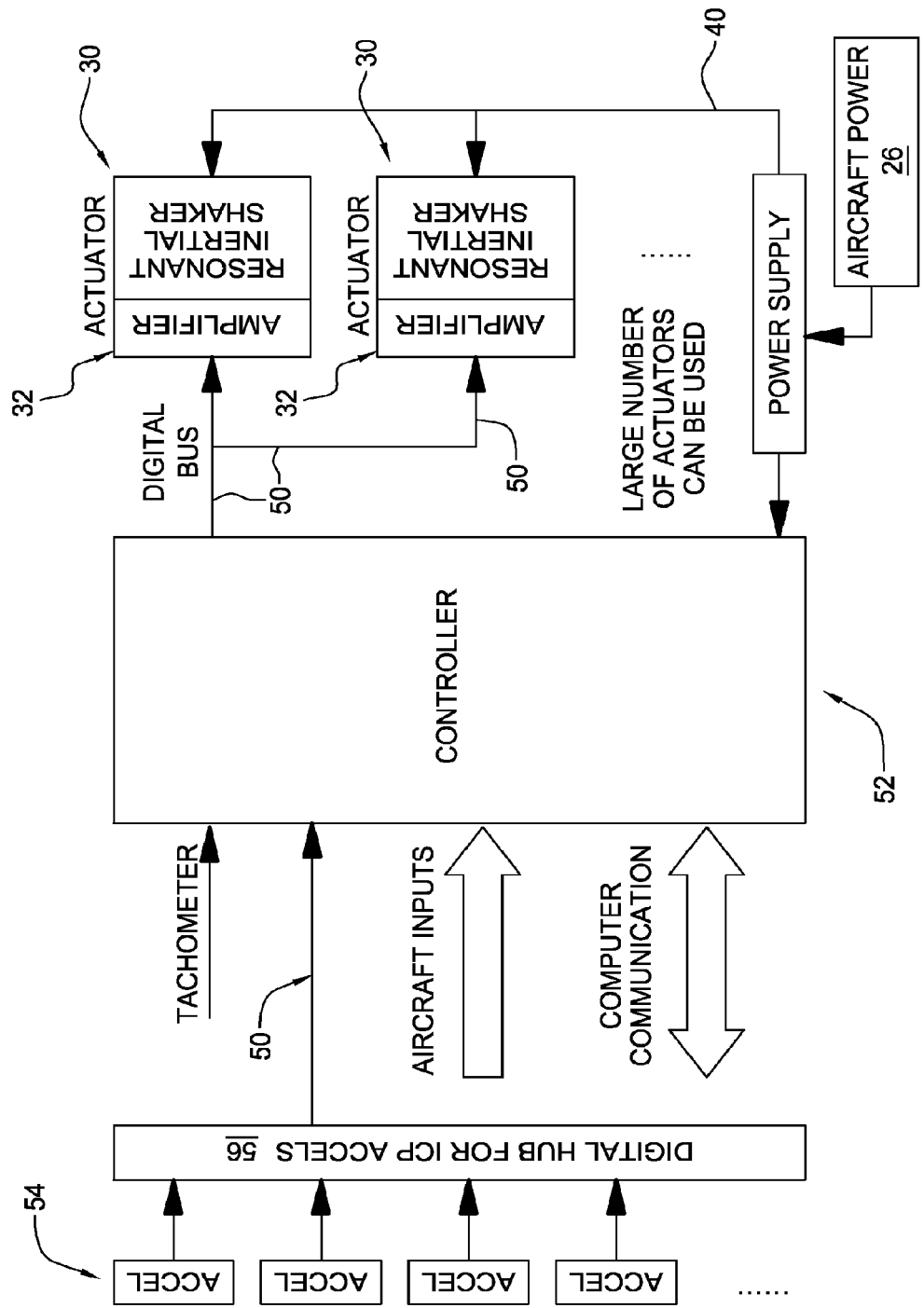

In an embodiment the invention includes a method of making an aircraft with suppressed inflight troublesome vibrations. The method includes providing an aircraft 20 comprised of an aerostructure 24. Preferably the aerostructure is comprised of the aircraft frame. Preferably the aerostructure is comprised of the structural body of aircraft vehicle experiencing and transmitting vibrations. The aircraft includes at least one rotating machine 22 creating troublesome vibrations. Preferably the aerostructure 24 is the nonrotating aircraft vehicle structure connected with the rotating machinery 22 creating troublesome vibrations with the aerostructure 24 experiencing the troublesome vibrations. The method includes providing at least first distributed active vibration electromagnetic force generator 30, the first distributed active vibration electromagnetic force generator 30 including a first distributed electronic control system 32 and a first electromagnetically driven mass 34. The method includes fixing the first distributed active vibration electromagnetic force generator 30 to the aerostructure 24 at a first distributed active vibration control system nodal site 28. The method includes providing at least a second distributed active vibration electromagnetic force generator 30, the second distributed active vibration electromagnetic force generator 30 including a second distributed electronic control system 32 and a second electromagnetically driven mass 34. The method includes fixing the second distributed active vibration electromagnetic force generator 30 to the aerostructure 24 at a second distributed active vibration control system nodal site 28. In a preferred embodiment the second distributed active vibration control system nodal site 28 is fixed distal from the first distributed active vibration control system nodal site. In an alternative preferred embodiment the first and second distributed active vibration electromagnetic force generator 30 are an adjacent pair of counterclockwise-clockwise circular force generators with proximate nodal sites 28 fixed to aerostructure 24 to provide for a biaxial force generator pairing. The method includes connecting the at least first and second electromagnetic force generators 30 with a plurality of electrical power distribution lines 40 to a power source 26. Preferably the power source directly outputs a plurality of electromagnetic force generator power outputs to the force generators 30. The method includes providing distributed expandable force generator data communications network 50, the distributed force generator data communications network 50 linking together the at least first and second distributed electronic control systems 32. The method includes communicating force generator vibration control data through the distributed force generator data communications network 50 independently of the electrical power distribution lines 40 to minimize the troublesome vibrations, wherein the force generator vibration control data is transmitted and shared through the communications network 50. The data communications network 50 provides for a separate and independent control of the electromagnetic force generators 30 from the electrical power lines 40 powering the force generators 30, with the power lines 40 preferably only transmitting power and not control signals. In an embodiment the distributed electronic control system 32 is contained proximate the first electromagnetically driven mass 34. In an embodiment the distributed electronic control system 32 is contained proximate the first electromagnetically driven mass 34 in the same containment chamber. In an embodiment the distributed electronic control system 32 is contained in a distributed electronic control system containment chamber, and the electromagnetically driven mass 34 is contained in an electromagnetically driven mass containment chamber. In an embodiment the distributed electronic control system containment chamber 32' is proximate and adjacent the electromagnetically driven mass containment chamber 34'. In an embodiment the distributed electronic control system containment chamber 32' is segregated from the electromagnetically driven mass containment chamber 34'. In an embodiment the distributed electronic control system 32 is contained proximate the first electromagnetically driven mass 34 in an adjacent separated containment chamber. In an embodiment the distributed electronic control system 32 is contained in separated containment chamber that is not on a shared base with 38 with the driven mass 34. In a preferred embodiment the distributed electronic control system 32 is proximate to moving mass 34 with the moving mass movement generating a cooling air flow pattern proximate the distributed electronic control system electronics 32, preferably with the containment chamber containing proximate members 32 and 34 including cooling airflow passage conduits. In an embodiment two electromagnetic force generators 30 share a joint distributed electronic control system 32 contained in a joint distributed electronic control system containment chamber 32' proximate both of the electromagnetic force generators 30. As shown in FIG. 19B, in an embodiment two electromagnetic force generators 30 share a joint distributed electronic control system 32 contained in a joint distributed electronic control system containment chamber 32' proximate both of the containment chambers 34' of both of the electromagnetic force generators 30, preferably a pair of a clockwise rotating circular force generator CFG and a counter-clockwise rotating circular force generator CFG.

In an embodiment the invention includes a method of making an aircraft vehicle vibration control system for suppressing troublesome vibrations. The method includes providing an aircraft vehicle structure 24. The aircraft vehicle structure 24 is connected with at least one rotating machine 22 creating troublesome vibrations. Preferably the structure 24 is comprised of the aircraft vehicle frame. Preferably the structure is comprised of the structural body of aircraft vehicle experiencing and transmitting the troublesome vibrations to be suppressed. Preferably the structure 24 is the nonrotating aircraft vehicle structure connected with the rotating machinery 22 creating troublesome vibrations with the structure 24 experiencing the troublesome vibrations. The method includes providing at least first distributed active vibration electromagnetic force generator 30, the first distributed active vibration electromagnetic force generator 30 including first distributed electronic control system 32 and first electromagnetically driven mass 34. The method includes fixing the first distributed active vibration electromagnetic force generator 30 to the structure frame 24 at a first distributed active vibration control system nodal site 28. The method includes providing at least second distributed active vibration electromagnetic force generator 30, the second distributed active vibration electromagnetic force generator 30 including second distributed electronic control system 32 and second electromagnetically driven mass 34. The method includes fixing the second distributed active vibration electromagnetic force generator 30 to the structure frame 24 at second distributed active vibration control system nodal site 28. The method includes connecting the at least first and second electromagnetic force generators 30 with electrical power distribution lines 40 to power source 26. The method includes providing distributed expandable force generator data communications network 50, the distributed force generator data communications network 50 linking together the at least first and second distributed electronic control systems 32, and communicating force generator vibration control data through the distributed force generator data communications network 50 independently of the electrical power distribution lines 40 to minimize the troublesome vibrations, wherein the force generator vibration control data is transmitted and shared through the communications network.

In an embodiment the invention includes an aircraft vehicle vibration control system for suppressing troublesome vehicle vibrations in a vehicle structure. Preferably the aircraft vehicle vibration control system suppresses the troublesome vehicle vibrations in the nonrotating vehicle structure 24 connected with the aircraft rotating machinery 22 creating the troublesome vibrations. The vehicle vibration control system includes the at least first distributed active vibration electromagnetic force generator 30. The first distributed active vibration electromagnetic force generator 30 including the first distributed electronic control system 32 and the first electromagnetically driven mass 34. The first distributed active vibration electromagnetic force generator 30 is fixed to the vehicle structure 24.

The vehicle vibration control system includes the at least second distributed active vibration electromagnetic force generator 30, the second distributed active vibration electromagnetic force generator 30 including second distributed electronic control system 32 and second electromagnetically driven mass 34, the second distributed active vibration electromagnetic force generator 30 fixed to the vehicle structure 24.

The vehicle vibration control system includes the plurality of electrical power distribution lines 40, the electrical power distribution lines 40 connecting the electromagnetic force generators 30 with power source 26 and providing the electromagnetic force generators 30 with their electromagnetic force generator power outputs. The vehicle vibration control system includes the distributed expandable force generator data communications network 50, the distributed force generator data communications network 50 linking together the at least first and second distributed electronic control systems 32 wherein the distributed electronic control systems 32 communicate force generator vibration control data through the distributed force generator data communications network 50 independently of the electrical power distribution lines 40 to minimize the troublesome vibrations.

In an embodiment the invention includes a method of suppressing troublesome vibrations. The method includes providing an aircraft vehicle structure 24 with troublesome vibrations. The method includes providing at least first distributed active vibration electromagnetic force generator 30, the first distributed active vibration electromagnetic force generator 30 including a first distributed electronic control system 32 and a first electromagnetically driven mass 34. The method includes fixing the first distributed active vibration electromagnetic force generator 30 to the structure 24 at a first distributed active vibration control system nodal site. The method includes providing at least second distributed active vibration electromagnetic force generator 30, the second distributed active vibration electromagnetic force generator 30 including second distributed electronic control system 32 and second electromagnetically driven mass 34. The method includes fixing the second distributed active vibration electromagnetic force generator 30 to the structure 24 at a second distributed active vibration control system nodal site. The method includes connecting the at least first and second electromagnetic force generators 30 with the plurality of electrical power distribution lines 40 to power source 26. The method includes providing distributed expandable force generator data communications network 50, the distributed force generator data communications network 50 linking together the at least first and second distributed electronic control systems 32 and the plurality of accelerometers sensing the troublesome vibrations. The method includes communicating force generator vibration control data through the distributed force generator data communications network 50 independently of the electrical power distribution lines 40 to minimize the troublesome vibrations, wherein the force generator vibration control data is transmitted and shared through the communications network 50.

Figure 22A:
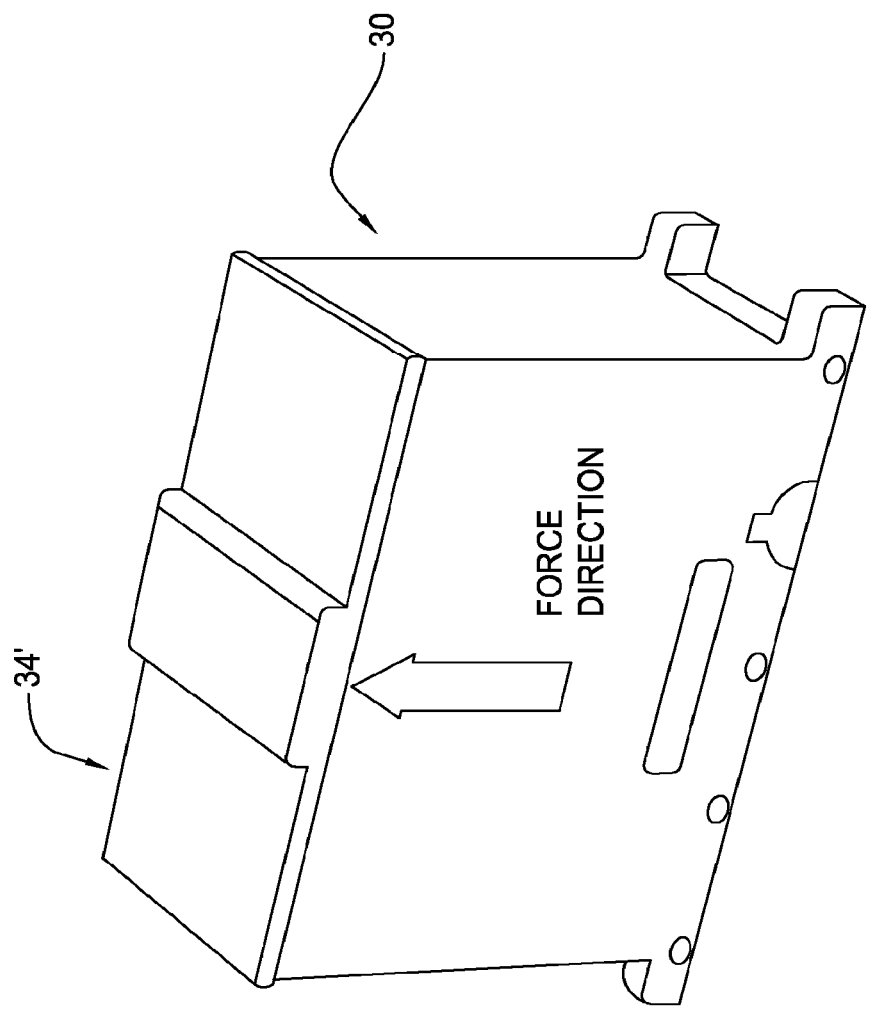
FIG. 22A-B illustrates linear motor electromagnetically driven sprung mass resonant inertial shakers.
Figure 22B:
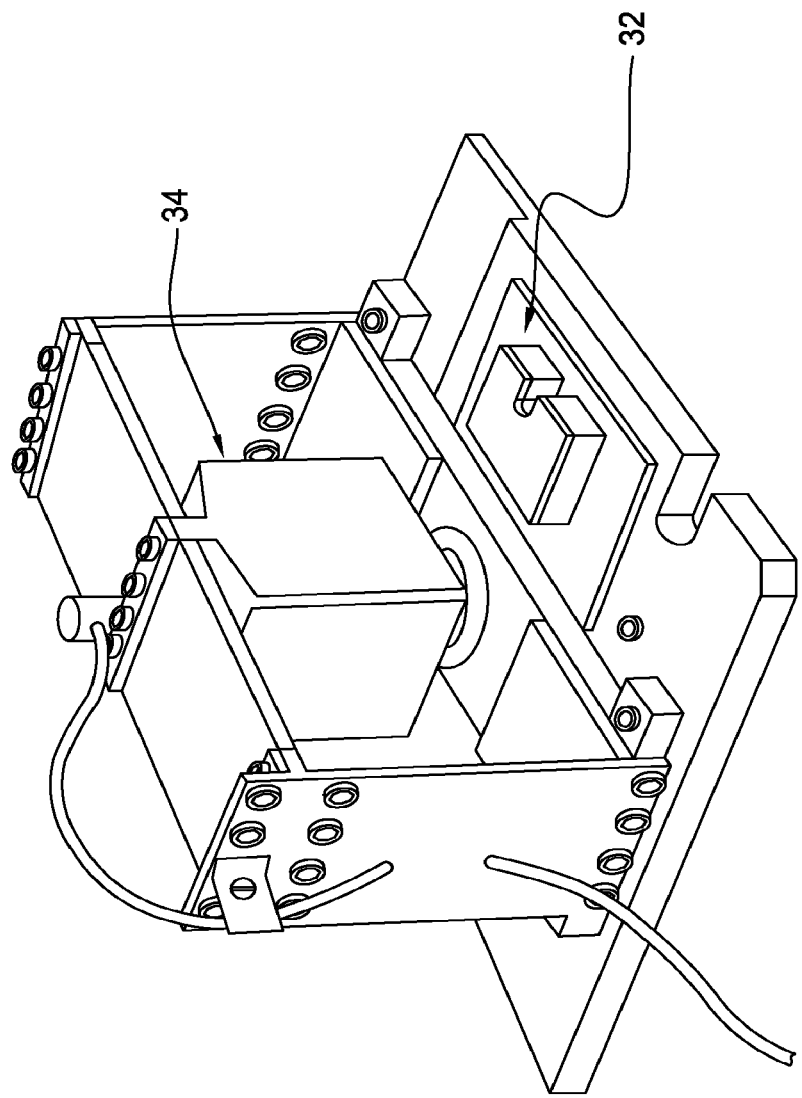
Figure 23:
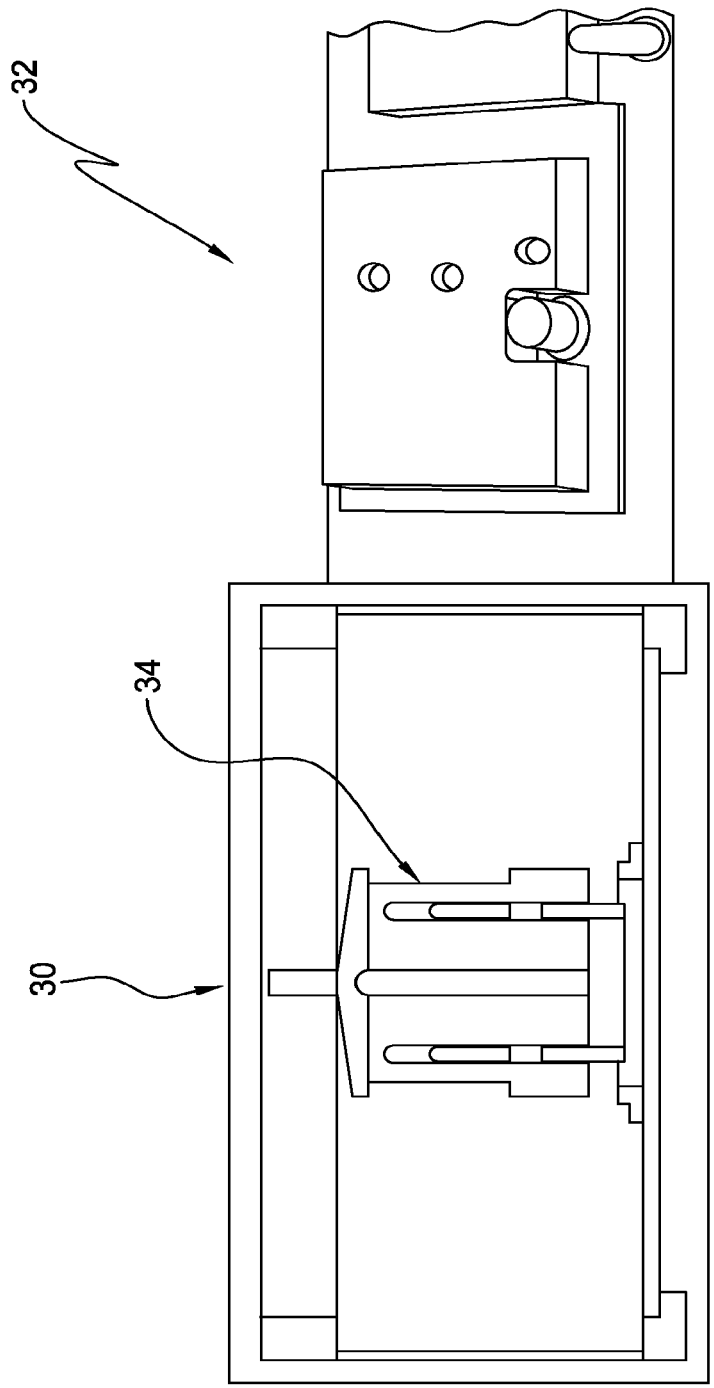
FIG. 23 illustrates a linear motor electromagnetically driven sprung mass resonant force generator and electronic control system.
Figure 24A:
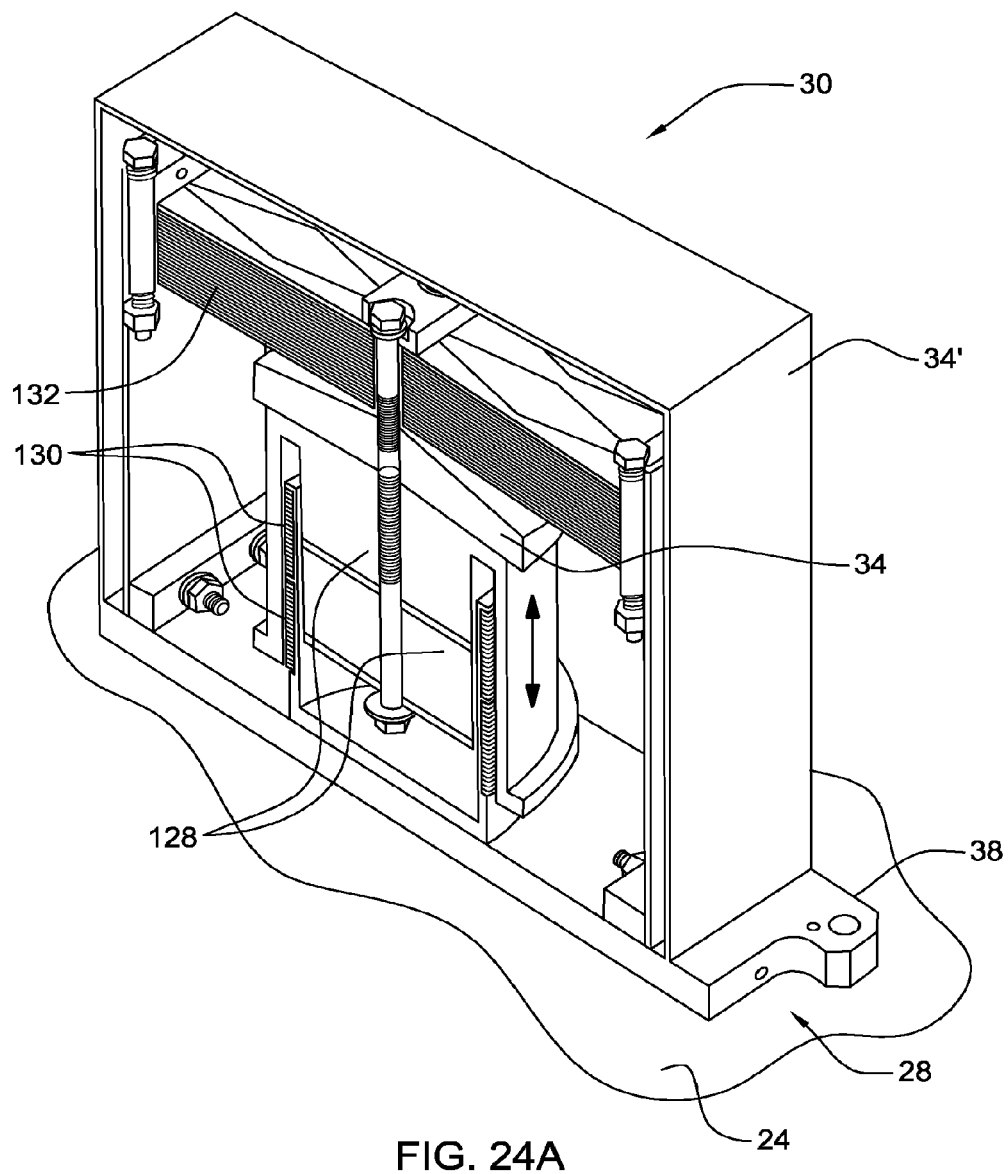
FIG. 24A-E illustrates a linear motor electromagnetically driven sprung mass resonant force generator and electronic control system.
Figure 24B:
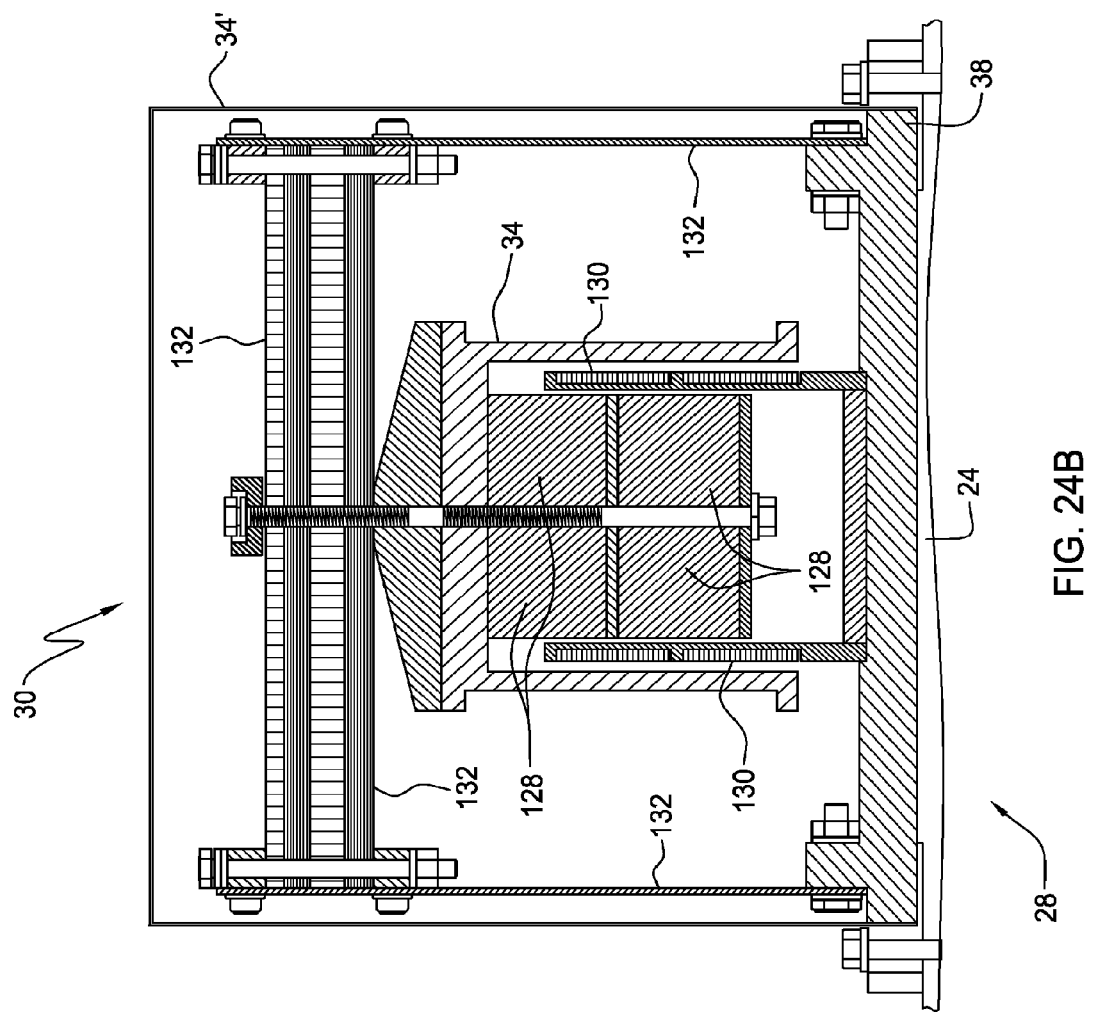
Figure 24C:
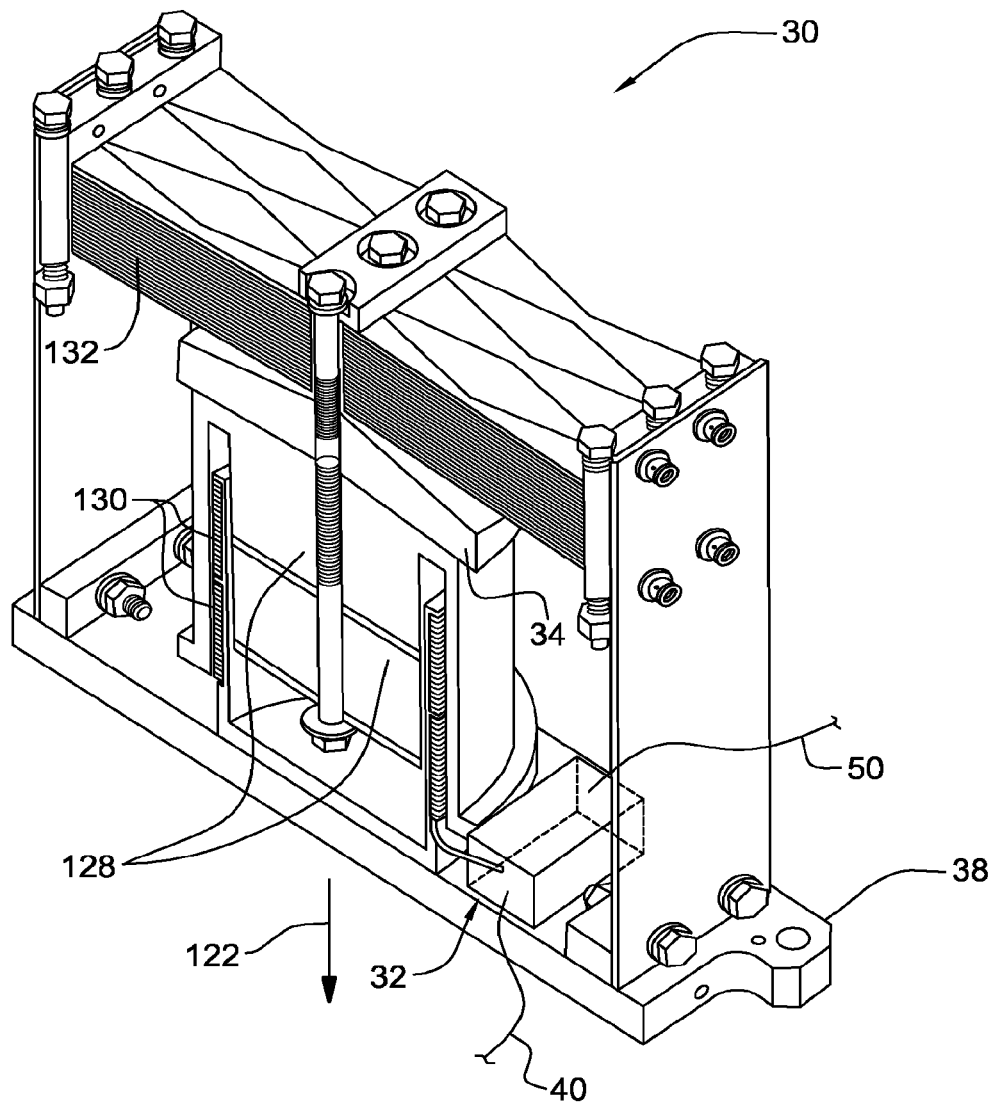
Figure 24D:
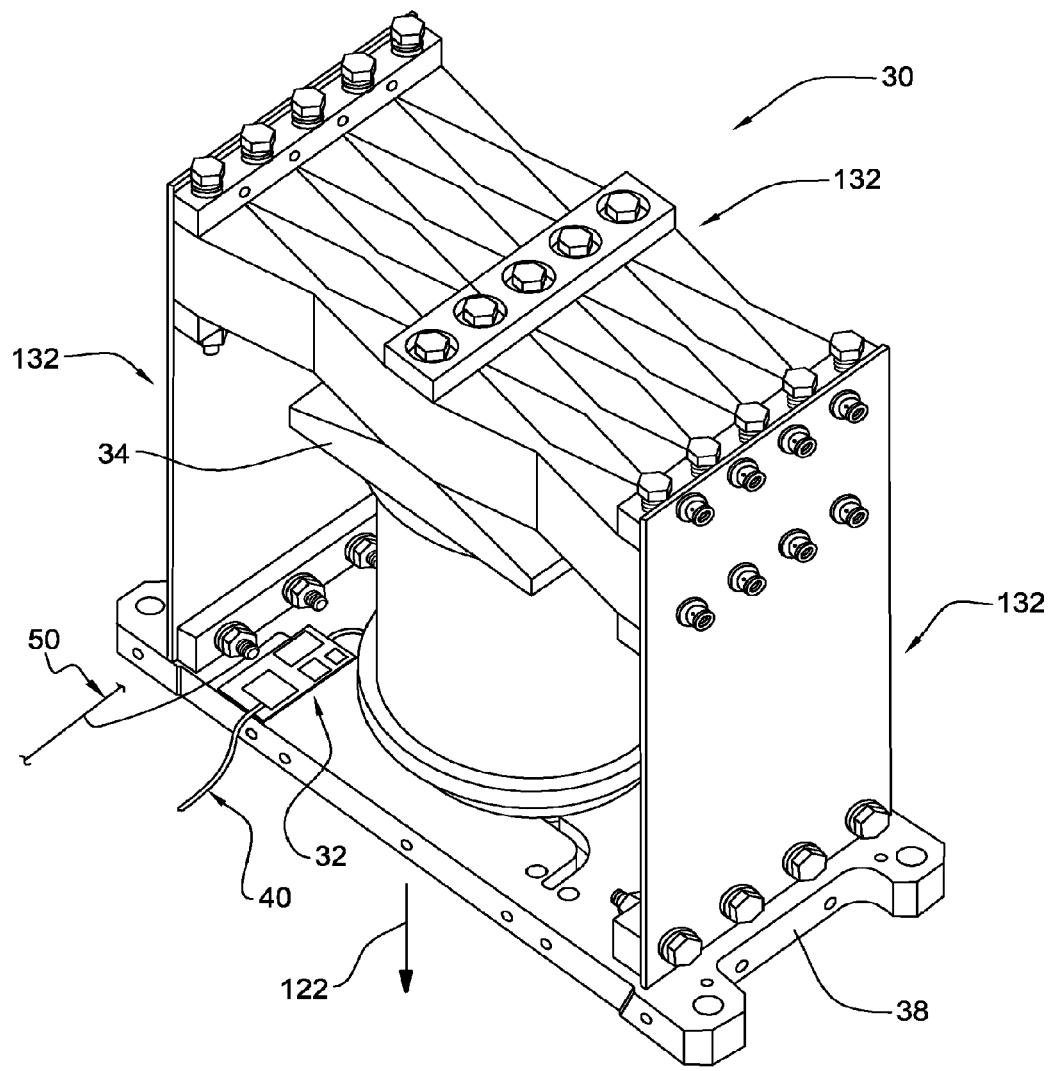
Figure 24E:
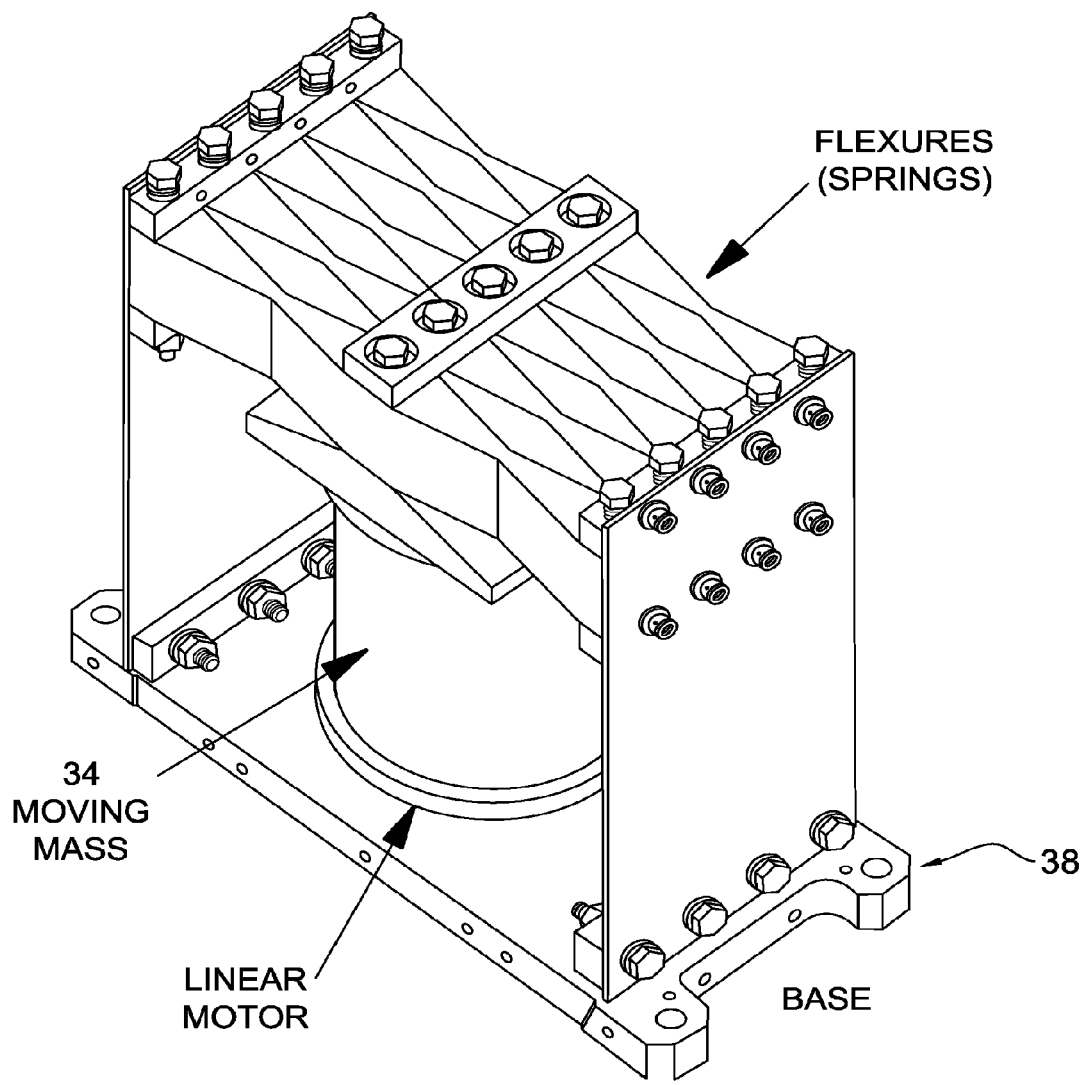

In embodiments the force generator 30 includes a sprung mass resonant actuator force generator 30 with a having a natural resonant frequency. The force generator 30 includes linear motor electromagnetically driven sprung mass 34 with the mass 34 driven by linear motor commands. Preferably the distributed electronic control system 32 executes a plurality of local force generator operation linear motor commands to the resonant the actuator to drive the resonant actuator about the resonant frequency when commanded by a received command signal through the data communications network 50, and preferably the resonant actuator 30 has a feedback output with the feedback output fed back into the resonant actuator electronic control system 32 wherein the resonant actuator electronic control system 32 adjusts the electrical drive current based on the resonant actuator feedback. As shown in FIG. 22-24 the resonant actuator 30 is an electromagnetically driven sprung mass 34 suspended on resilient metal flexures 132. As shown in FIG. 24A-D, the EM (ElectroMagnetic)

driven mass 34 is preferably suspended on a horizontal beam stack of multiple layers of resilient flexures 132, which are preferably supported by two vertical side resilient flexures post plates, to provide a sprung mass that can be electromagnetically driven to oscillate at its natural resonant frequency. Preferably the resonant actuator sprung mass is driven by modulating an electromagnetic field so the sprung mass is attracted and repelled by the EM field at its resonant frequency. Preferably the resonant actuator sprung mass includes a permanent magnet 128 in alignment with an electromagnetic coil 130, wherein a electrical drive current supplied to the EM coil 130 drives the sprung mass at resonance. In preferred embodiments a plurality of linear motor electromagnetically driven sprung mass force generators 30 are connected on the data communications network 50, with at least a first force generator having a first force generation maximum and the at least a second force generator having a second force generation maximum, with the second force generation maximum greater than the first force generation maximum, with the force generators having different force generation maximums operating on the data communications network 50 to minimize vibrations in the aircraft.

The vibration control system preferably receives accelerometer signals and a tachometer signal (preferably representative of the rotating machinery 22). The vibration control system preferably utilizes an adaptive vibration control algorithm such that the force generators 30 generate forces that are inputted into the structure 24 that they are fixed to minimize the accelerometer signals.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

We claim:

1. An aircraft, said aircraft comprised of a nonrotating vehicle structure, said nonrotating vehicle structure including a plurality of distributed active vibration control system sites, with said aircraft including:
    at least a first distributed active vibration circular force generator, said first distributed active vibration circular force generator fixed to said nonrotating vehicle structure at a first distributed active vibration control system site,
    at least a second distributed active vibration circular force generator, said second distributed active vibration circular force generator fixed to said nonrotating vehicle structure at a second distributed active vibration control system site,
    a plurality of electrical power distribution lines, said electrical power distribution lines connecting said circular force generators with a power source,
    a distributed circular force generator data communications network, said distributed circular force generator data communications network linking together at least said first distributed active vibration circular force generator and at least said second distributed active vibration circular force generator, with at least said first distributed active vibration circular force generator and at least said second distributed active vibration circular force generator communicating circular force generator vibration control data through said distributed force generator data communications network independently of said electrical power distribution lines, with said first distributed active vibration circular force generator and said second distributed active vibration circular force generator outputting circular forces into said nonrotating vehicle structure to minimize a plurality of troublesome vibrations.

2. An aircraft as claimed in claim 1, including a master system controller, said master system controller connected to said distributed force generator data communications network wherein said master system controller provides a plurality of authority commands to at least said first distributed active vibration circular force generator and said second distributed active vibration circular force generator with said first distributed active vibration circular force generator and said second distributed active vibration circular force generator executing a plurality of subordinate local circular force generator operation commands.

3. An aircraft as claimed in claim 1, including a migrating master system control authority, said migrating master system control authority movable between at least said first distributed active vibration circular force generator and said second distributed active vibration circular force generator, with the migrating master system control authority providing a plurality of authority commands to at least said first distributed active vibration circular force generator and said second distributed active vibration circular force generator to execute a plurality of subordinate local force generator operation commands.

4. An aircraft as claimed in claim 1, including a distributed master system control authority, said distributed master system control authority distributed among at least said first distributed active vibration circular force generator and said second distributed active vibration circular force generator with the distributed master system control authority providing a plurality of authority commands to at least said first distributed active vibration circular force generator and said second distributed active vibration circular force generator to execute a plurality of subordinate local force generator operation commands.

5. An aircraft as claimed in claim 1, including at least a first distributed networked accelerometer, said at least first distributed networked accelerometer having an accelerometer network link with said distributed force generator data communications network.

6. An aircraft as claimed in claim 1, wherein said first distributed active vibration circular force generator executes a plurality of local circular force generator operation rotating motor commands, and said second distributed active vibration circular force generator executes a plurality of local force generator operation rotating motor commands.

7. An aircraft as claimed in claim 1, wherein said troublesome vibrations are created by an aircraft rotating machine and said first distributed active vibration control system site is distal from said aircraft rotating machine, and said second distributed active vibration control system site is distal from said aircraft rotating machine.

8. A method of making a vibration control system for suppressing troublesome vibrations in a structure with at least one rotating machine creating troublesome vibrations, said method comprising:
    providing at least a first distributed active vibration circular force generator, said first distributed active vibration circular force generator including a first distributed electronic control system,
    fixing said first distributed active vibration circular force generator to said structure at a first distributed active vibration control system site, providing at least a second distributed active vibration circular force generator, said second distributed active vibration circular force generator including a second distributed electronic control system, fixing said second distributed active vibration circular force generator to said structure at a second distributed active vibration control system site, connecting said at least first and second circular force generators with a plurality of electrical power distribution lines to a power source, providing a distributed force generator data communications network, said distributed force generator data communications network linking together said at least first and second distributed electronic control systems, communicating force generator vibration control data through said distributed force generator data communications network independently of said electrical power distribution lines to generate circular forces to minimize said troublesome vibrations.

9. A method as claimed in claim 8, wherein said first distributed active vibration control system site is distal from said at least one rotating machine.

10. A method as claimed in claim 9, wherein said second distributed active vibration control system site is distal from said at least one rotating machine.

11. A method as claimed in claim 9, wherein said first distributed active vibration circular force generator includes a first containment chamber containing said first distributed electronic control system and a second containment chamber containing at least a first electromagnetically driven rotating mass.

12. A method as claimed in claim 11, wherein said second containment chamber contains a second corotating electromagnetically driven rotating mass.

13. A vehicle vibration control system for suppressing troublesome vehicle vibrations in a vehicle structure connected with at least one rotating machine creating troublesome vibrations in said vehicle structure, said vehicle vibration control system including:

at least a first distributed active vibration circular force generator, said first distributed active vibration circular force generator including a first distributed electronic control system and a first rotating mass, said first distributed active vibration circular force generator for fixing to said vehicle structure at a first distributed active vibration control system site, at least a second distributed active vibration circular force generator, said second distributed active vibration circular force generator including a second distributed electronic control system and a second rotating mass, said second distributed active vibration circular force generator for fixing to said vehicle structure at a second distributed active vibration control system site, a plurality of electrical power distribution lines, said electrical power distribution lines for connecting said first distributed active vibration circular force generator and said second distributed active vibration circular force generator with a power source, a distributed force generator data communications network, said distributed force generator data communications network for linking together said at least first and second distributed electronic control systems wherein said distributed electronic control systems communicate circular force generator vibration control data through said distributed force generator data communications network independently of said electrical power distribution lines to minimize said troublesome vibrations.

14. A system as claimed in claim 13 wherein said first distributed active vibration circular force generator includes a first containment chamber containing said first distributed electronic control system and a second containment chamber containing said first rotating mass.

15. A system as claimed in claim 14 wherein said second containment chamber contains a second corotating electromagnetically driven rotating mass.

16. A method of suppressing a plurality of vibrations, said method comprising:

providing a structure, providing at least a first distributed active vibration electromagnetic force generator, said first distributed active vibration electromagnetic force generator including a first distributed electronic control system and at least a first electromagnetically driven mass, fixing said first distributed active vibration electromagnetic force generator to said structure at a first distributed active vibration control system site, providing at least a second distributed active vibration electromagnetic force generator, said second distributed active vibration electromagnetic force generator including a second distributed electronic control system and at least a second electromagnetically driven mass, fixing said second distributed active vibration electromagnetic force generator to said structure at a second distributed active vibration control system site, connecting said at least first electromagnetic force generator and said at least second electromagnetic force generator to a power source to provide an electromagnetic source of power, providing a distributed force generator data communications network, said distributed force generator data communications network linking together said at least first distributed electronic control system and said at least second distributed electronic control system, communicating force generator vibration control data through said distributed force generator data communications network independently of said electromagnetic source of power to minimize said vibrations.

17. A method as claimed in claim 16, wherein said first distributed active vibration electromagnetic force generator at least first electromagnetically driven mass is comprised of a sprung mass resonant actuator force generator having a natural resonant frequency.

18. A method as claimed in claim 16, wherein said first distributed active vibration electromagnetic force generator at least first electromagnetically driven mass is comprised of a linear motor electromagnetically driven sprung mass.

19. A method as claimed in claim 16, wherein said first distributed active vibration electromagnetic force generator at least first electromagnetically driven mass is comprised of a first rotating mass.

20. A method as claimed in claim 19, wherein said first distributed active vibration electromagnetic force generator includes a second corotating electromagnetically driven rotating mass.

\* \* \* \* \*